United States Patent [19]
Okuno

[11] Patent Number: 6,085,043
[45] Date of Patent: *Jul. 4, 2000

[54] APPARATUS HAVING A POWER SWITCH CONTROLLED BY AN OPERATING DEVICE OF AN OPTICAL DEVICE

[75] Inventor: Ryoji Okuno, Kanagawa-ken, Japan

[73] Assignee: Canon Kabushiki Kaisha, Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/410,751

[22] Filed: Mar. 27, 1995

[30] Foreign Application Priority Data

Mar. 31, 1994 [JP] Japan ...................................... 6-083590
Mar. 31, 1994 [JP] Japan ...................................... 6-083591

[51] Int. Cl.[7] ..................................................... G03B 12/24
[52] U.S. Cl. ........................... 396/132; 396/418; 396/538
[58] Field of Search ................................... 396/387, 411, 396/418, 538, 132

[56] References Cited

U.S. PATENT DOCUMENTS

| | | | |
|---|---|---|---|
| 4,363,547 | 12/1982 | Hashimoto et al. | 396/441 |
| 4,829,328 | 5/1989 | Tanaka et al. | 396/418 |
| 5,159,365 | 10/1992 | Takahashi et al. | 396/285 |
| 5,168,295 | 12/1992 | Yoshihara et al. | 396/411 X |

Primary Examiner—David M. Gray
Attorney, Agent, or Firm—Robin, Blecker & Daley

[57] ABSTRACT

An apparatus including a switching device for switching a power transmission system between first and second states. A holding device holds the switching device at least in the first or the second state. The holding device utilizes an operation device for operating an optical device. An apparatus also for use with a performing device for performing an action relating to at least one of loading and unloading actions of an image recording medium and to a moving device for moving the medium. The latter apparatus includes a transmitting device for transmitting a driving force to the performing device and moving device and a switching device for switching the destination of the driving force.

29 Claims, 23 Drawing Sheets

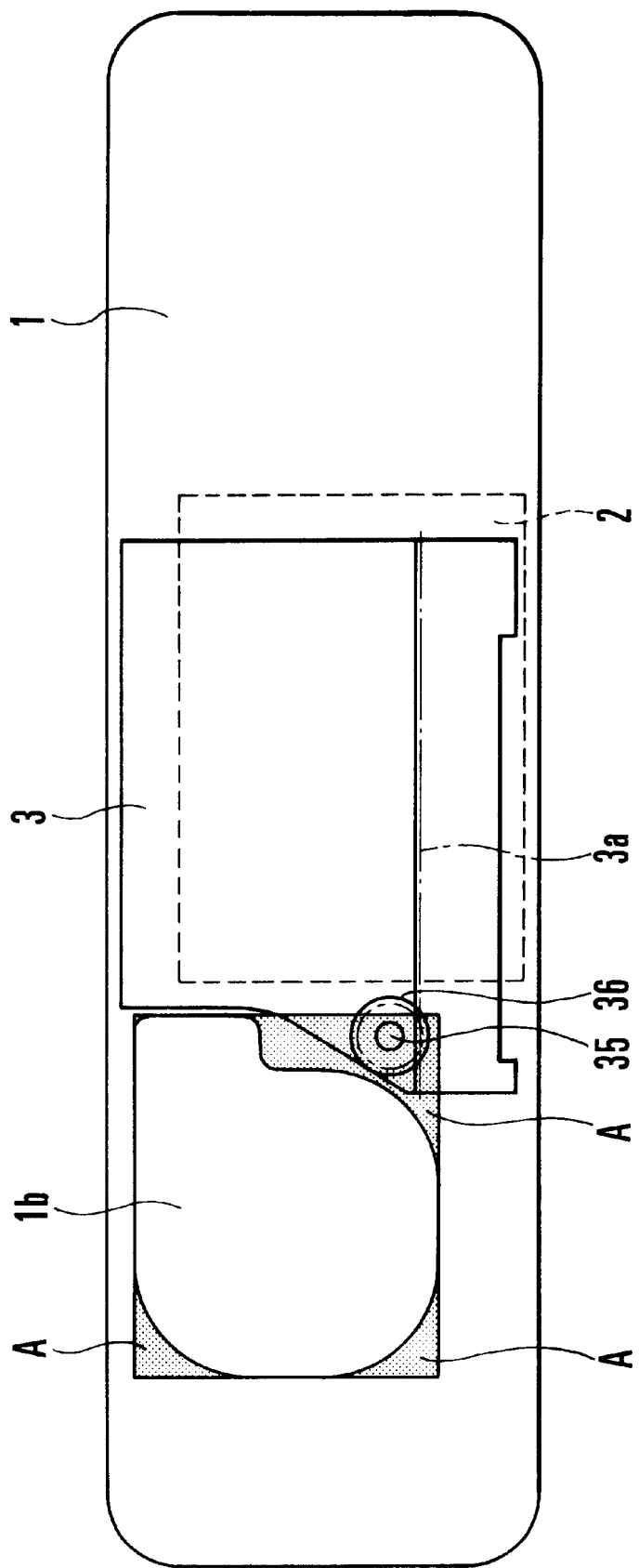

(PHOTOGRAPHABLE POSITION)

(BARREL-RETRACTED POSITION (1) OR (2))

(FILM CARTRIDGE NOT LOADED, CARTRIDGE CHAMBER LID CLOSED)

(CARTRIDGE CHAMBER LID BEGINNING TO OPEN)

(IMMEDIATELY BEFORE CARTRIDGE CHAMBER LID IS FULLY OPENED)

(FILM CARTRIDGE BEING INSERTED)

(IMMEDIATELY AFTER COMPLETION OF INSERTION OF FILM CARTRIDGE)

(CARTRIDGE CHAMBER LID BEGINNING TO CLOSE)

(IMMEDIATELY AFTER COMPLETION OF CLOSING OF CARTRIDGE CHAMBER LID)

(BLANK FEEDING OF FILM COMPLETED)

(REWINDING FILM)

(IMMEDIATELY BEFORE COMMENCEMENT OF SENDING OUT FILM CARTRIDGE)

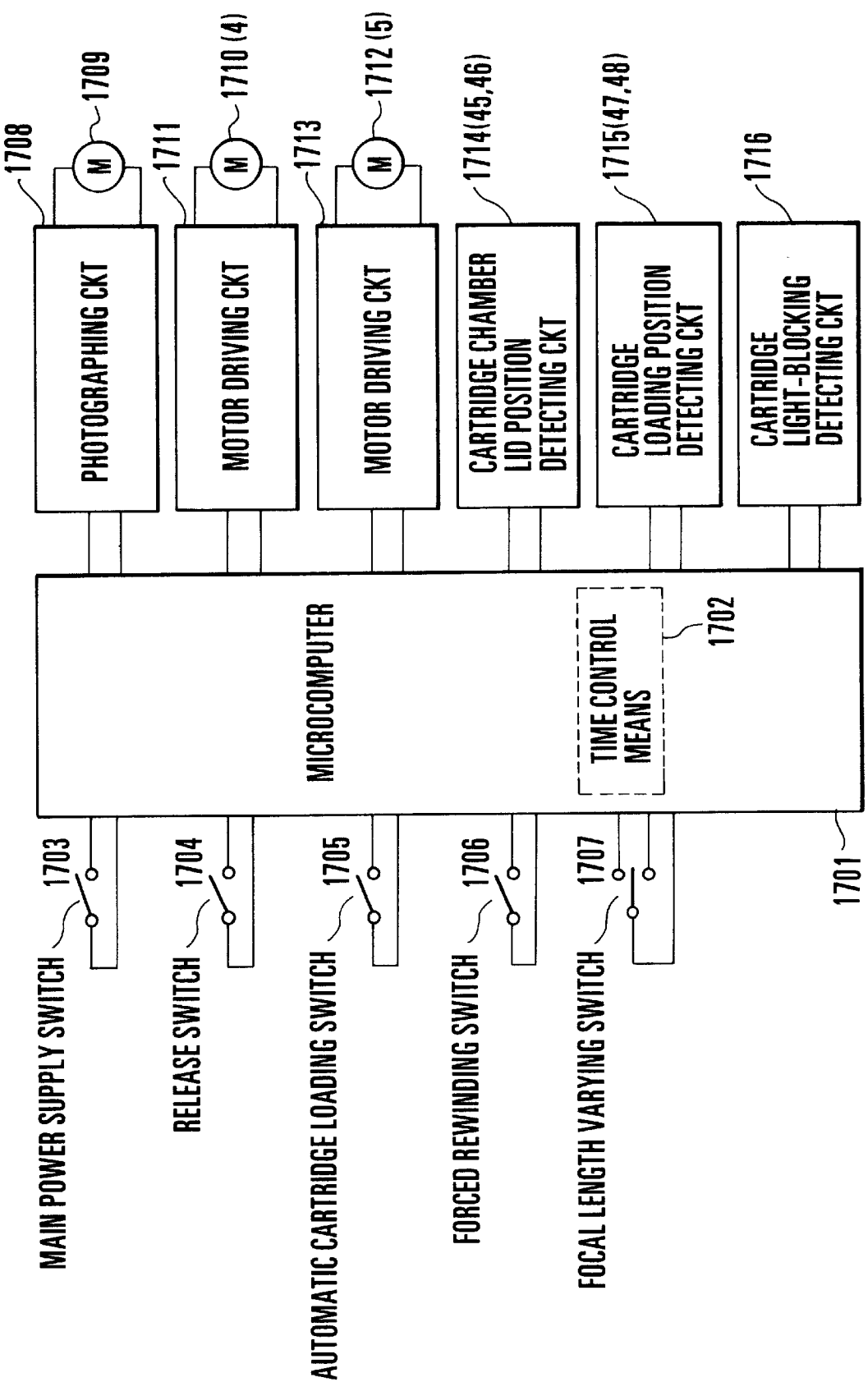

APPARATUS HAVING A POWER SWITCH CONTROLLED BY AN OPERATING DEVICE OF AN OPTICAL DEVICE

BACKGROUND OF THE INVENTION

1. Field of the Invention

This invention relates to an improvement on a power dividing device of an apparatus such as a camera arranged to change the destination of transmission of power of a motor or the like from one destination over to another.

2. Description of the Related Art

Referring to FIGS. 22(a) and 22(b), in loading a camera with a film cartridge 104, it has been practiced in general to open a back lid 101 backward from a camera body 102 and to place the cartridge 104 in a cartridge chamber 103 which has an open part in the camera body. According to this method, however, a complex mechanism within the camera is exposed to the user of the camera when the back lid 101 is open. Therefore, if the user is unaccustomed to cameras, the method tends to make the user feel uneasy. Besides, there is some subtle difference among cameras in the manner in which a film cartridge is to be loaded. Such difference complicates film cartridge loading procedures, to cause the user to fumble with the camera or the film cartridge. The conventional method thus has either caused failures in loading cameras with film cartridges or necessitated a troublesome loading operation.

To solve this problem, a camera which has recently been proposed has a film cartridge loading structure which is arranged as shown in FIG. 23.

Referring to FIG. 23, this camera includes a cartridge chamber lid 201 which is arranged to open and close by sliding within the camera and a motor 202 which is a drive source for the lid 201. When a film cartridge 203 is inserted with the cartridge chamber lid 201 opened as shown, the film cartridge 203 is automatically pulled into a cartridge chamber 206 by means of a driving roller 204, a motor 205, etc., which are disposed within the camera body. The film cartridge 203 thus can be perfectly loaded without the aid of a human hand. Conversely, in taking out the film cartridge 203, the motor 202 is first driven to open the cartridge chamber lid 201. After that, the film cartridge 203 is sent out by the motor 205, the driving roller 204, etc., to a position where the cartridge 203 can be easily taken out. The camera arranged in this manner has a less number of parts of an internal mechanism exposed to the eye of the camera user and is simpler than the conventional loading method. The camera allows even a beginner photographer to easily load a film cartridge.

However, in the case of the camera having the film cartridge loading structure arranged as shown in FIG. 23, the use of motors for moving the cartridge chamber lid 201 and the film cartridge 203 has presented new problems, which are as follows (i) In case where motors are arranged separately for driving the cartridge chamber lid 201 and for moving the film cartridge 203, the size of the whole mechanism of the camera increases, because each of these motors requires its own reduction gear train separately from that of the other.

(ii) With the motors and the reduction gear trains arranged respectively for the cartridge chamber lid 201 and for the film cartridge 203 as mentioned above, the arrangement inevitably brings about an increase in cost.

SUMMARY OF THE INVENTION

It is one aspect of this invention to provide a camera, an apparatus, or a device for the camera or the apparatus, which is adapted for use of actuating means for actuating an optical system and arranged to be capable of carrying out switching a power transmission system between at least first and second states in a compact size and at a low cost. To attain this aspect, the camera, the apparatus or the device includes first means for switching the state of the power transmission system at least between the first state and the second state and second means for holding the first means at least in the first state or the second state through the actuating means.

The above and other aspects and features of this invention will become apparent from the following detailed description of embodiments thereof taken in conjunction with the accompanying drawings.

BRIEF DESCRIPTION OF THE DRAWINGS

FIG. 6 is a bottom view of a camera showing transmission gears arranged to directly drive a cartridge chamber lid shown in FIG. 4, etc.

FIG. 19 is a block diagram showing essential parts of electric arrangement of the camera arranged as an embodiment of this invention.

DETAILED DESCRIPTION OF THE PREFERRED EMBODIMENT

An embodiment of this invention is described in detail below with reference to the drawings.

Figure 1:
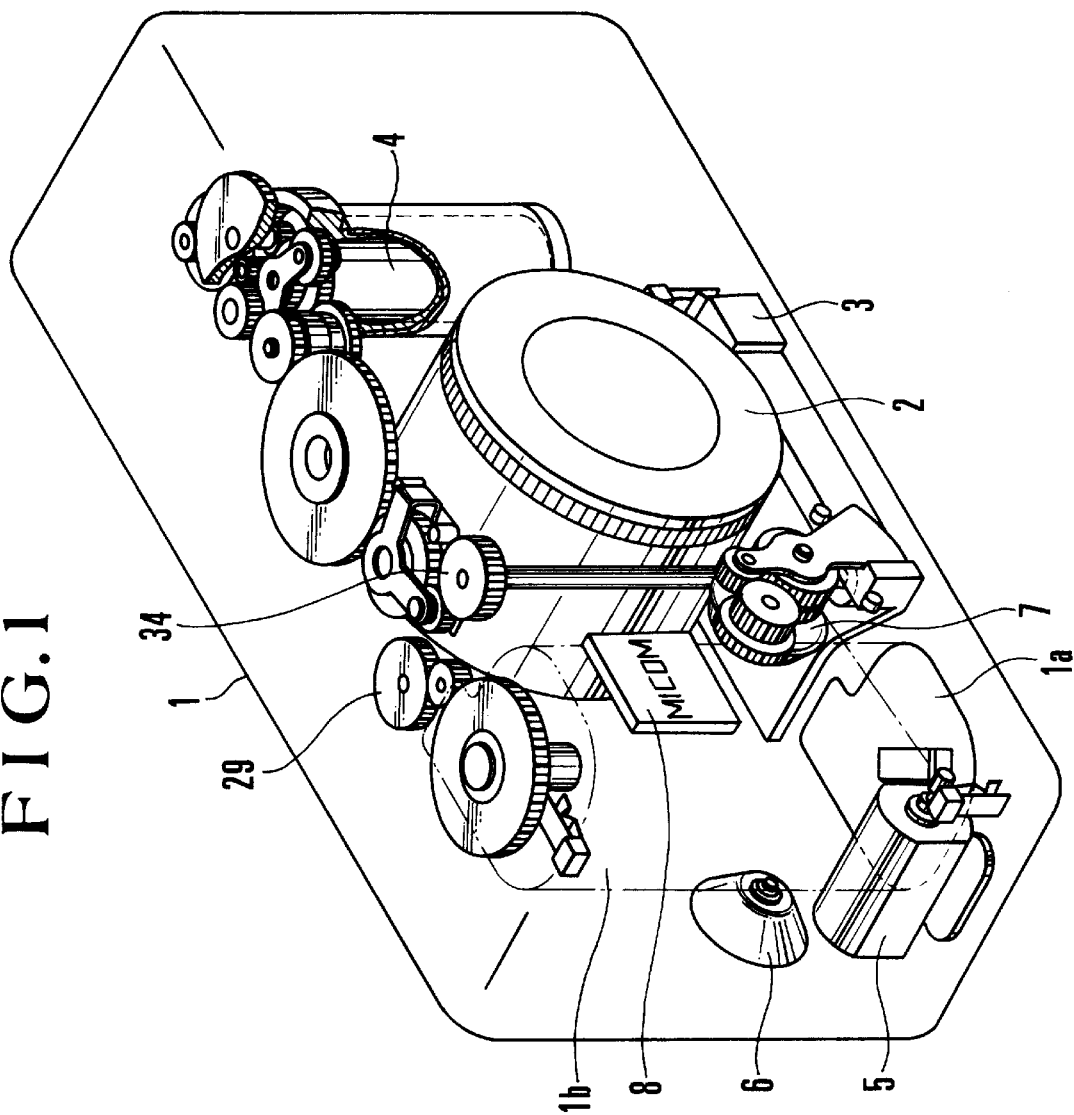
FIG. 1 is an oblique view showing arrangement of essential parts of a camera which is arranged according to this invention as an embodiment thereof.

FIG. 1 is an oblique view showing the mechanical arrangement of essential parts of a camera which is an embodiment of this invention. Referring to FIG. 1, the illustration includes a camera body 1, an opening 1a which is provided for insertion of a film cartridge, a cartridge chamber 1b, a photo-taking lens barrel 2, a cartridge chamber lid 3 which is arranged to open and close the cartridge chamber 1b, a first motor 4 which is used for film transport driving and also for driving the cartridge chamber lid 3 to open and close the cartridge chamber 1b, and a second motor 5 which is used for driving the photo-taking lens barrel 2 and also for driving the film cartridge to move (pulling in and sending out). A driven roller 6 which is arranged in a conic shape to move the film cartridge is rotatably mounted on the camera body 1. A driving roller 7 which is also in a conic shape like the driven roller 6 (as will be described later with reference to FIG. 5) is provided for moving the film cartridge. A microcomputer (MICOM) 8 is arranged to control various actions of the camera.

In the case of this embodiment, the camera is arranged to use a film cartridge which is of the kind arranged to have a film completely wound up in an unused state within the cartridge as disclosed in U.S. Pat. No. 5,200,777. The camera is arranged such that, when the film cartridge is loaded in place within the camera, a spool which is within the film cartridge is driven to move in the direction of sending the film out from the cartridge. The fore end of the film is then slid in between a pressing plate and an aperture provided within the camera. After that, when the film is wound up on a film take-up spool disposed on the side of the camera, the spool driving action is switched over to driving the film take-up spool on the side of the camera to carry out blank film feeding. An automatic film loading is accomplished by this.

Figure 2:
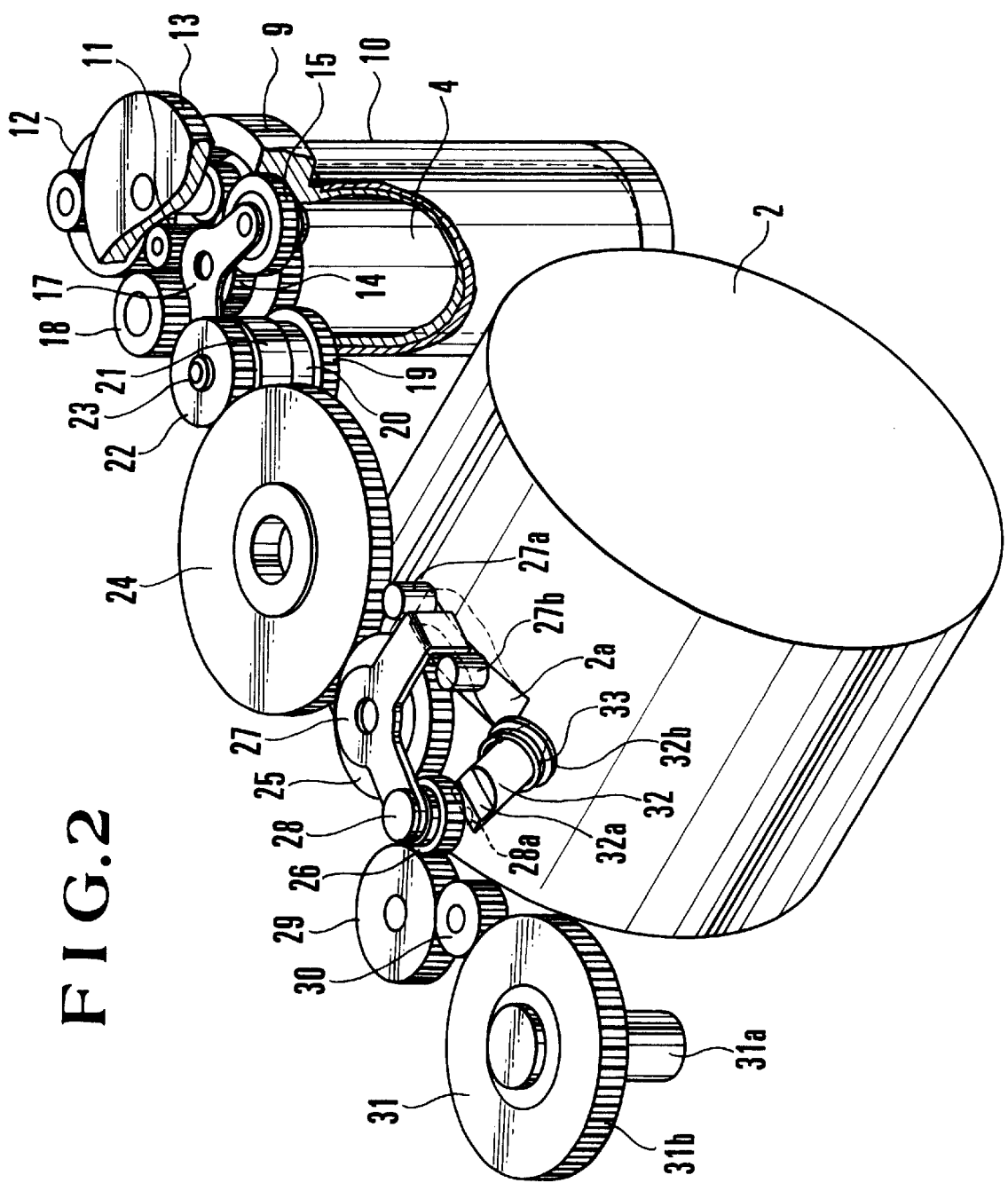
FIG. 2 is an oblique view showing a film transport mechanism included in the camera of FIG. 1.
Figure 3:
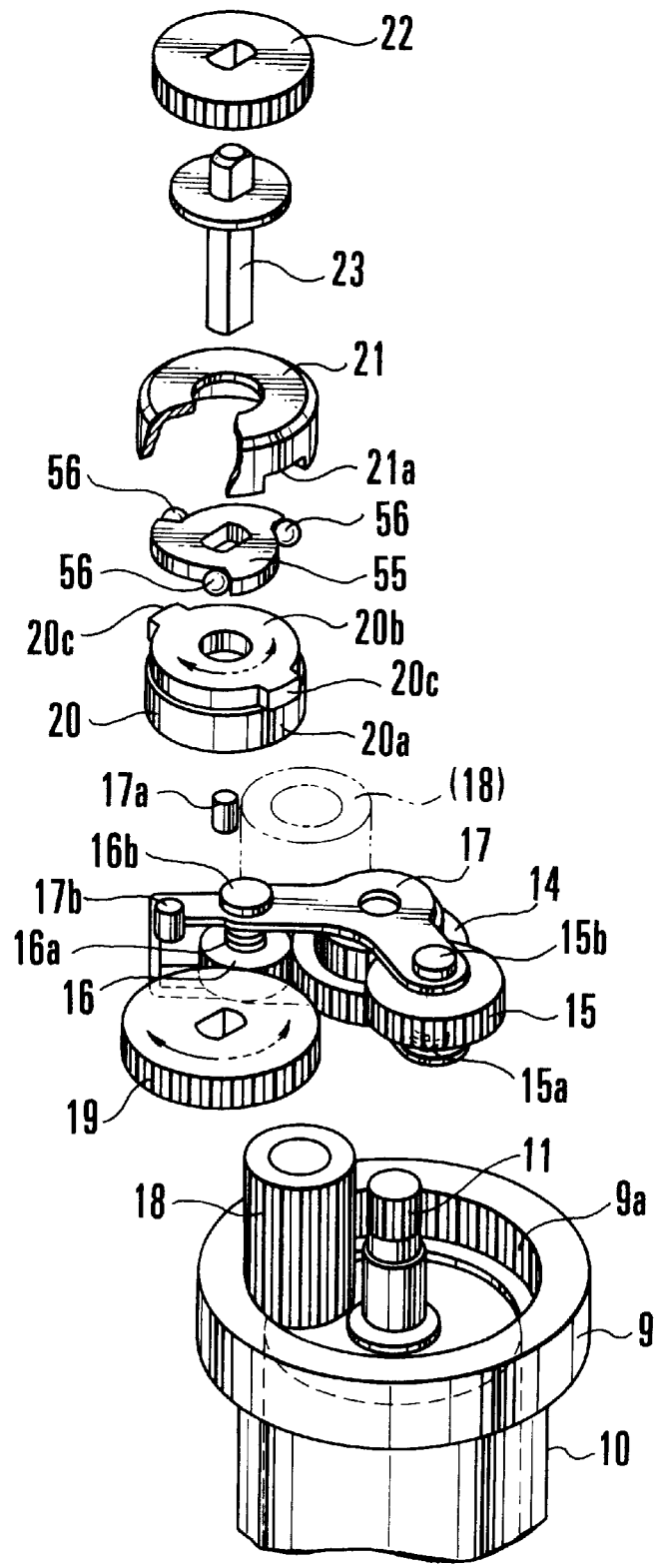
FIG. 3 is an exploded oblique view showing in detail the arrangement of a part of FIG. 2.

FIG. 2 is an oblique view of a film transport mechanism arranged in the camera. FIG. 3 is an exploded oblique view showing the details of a part of FIG. 2. Referring to FIG. 2, the first motor 4 which is shown also in FIG. 1 is arranged as a drive source to drive film transportation and to drive the cartridge chamber lid 3 to open and close. A pinion gear 11 is disposed at the end of the shaft of the first motor 4. A reduction gear 12 is in mesh with the pinion gear 11. A reduction gear 13 is in mesh with the reduction gear 12. A sun gear 14 is in mesh with the reduction gear 13.

Referring to FIGS. 2 and 3, a planet gear 15 is arranged to coact with a one-way gear 20. A spring 15a is arranged to generate a frictional force. A rotation shaft 15b is provided for the planet gear 15. A planet gear 16 is arranged to coact with a one-way gear 19 and a transmission gear 18. A spring 16a generates a frictional force. A rotation shaft 16b is provided for the planet gear 16. A planetary plate 17 is arranged to carry the planet gears 15 and 16. A planetary plate stopper 17a is arranged to act in winding a film. A planetary plate stopper 17b is arranged to act in rewinding the film. The transmission gear 18 is arranged to come to mesh with the planet gear 16 in winding the film.

A reference numeral 9 denotes the film take-up spool, which has an internal gear 9a. The internal gear 9a is in mesh with the transmission gear 18. A friction band 10 which is made of an elastic material is wound on the surface of the film take-up spool 9. A one-way gear 19 is formed in one body with a rotation shaft 23 and is arranged to mesh with the planet gear 16 in rewinding the film. A one-way gear 20 is rotatably fitted on the rotation shaft 23 and is arranged to mesh with the planet gear 15 in winding the film. As shown in FIG. 3, the one-way gear 20 has a gear member 20a and also has, on its end face, a table 20b and engaging parts 20c. A one-way plate 55 is fitted on the rotation shaft 23 in one body with the latter and carries steel balls 56 at three parts. One-way cover 21 is fitted on the rotation shaft 23 to be rotatable on the latter. A groove part 21a is arranged at one end part of the one-way cover 21 to engage the engaging part 20c of the one-way gear 20. They are thus arranged to be in one body. A transmission gear 22 engages the rotation shaft 23.

The group of members from one-way gear 19 through the rotation shaft 23, the one-way plate 55 and the steel balls 56 form one-way clutch mechanism. Referring to FIG. 3, when the one-way gear 19 and the one-way gear 20 are rotating in the direction of arrows indicated by full lines (to the right), if the rotational frequency per unit of time of the one-way gear 19 comes to exceed that of the one-way gear 20, the steel balls 56 retreat to recessed parts of the one-way plate 55 to cancel the state of having the one-way gears 19 and 20 rotating in one body. Conversely, when they rotate in the direction of arrows indicated by broken lines (to the left), if the rotation frequency per unit time of the one-way gear 20 comes to exceed that of the one-way gear 19, the rotation in one body of these one-way gears 19 and 20 is canceled also by the retreating action of the steel balls 56 to the above-stated recessed parts.

Referring again to FIG. 2, a transmission gear 24 is in mesh with the transmission gear 22. A sun gear 25 is in mesh with the transmission gear 24. A planet gear 26 is arranged to revolve about the sun gear 25. A planetary plate 27 is arranged to carry the planet gear 26. A planet gear shaft 28 is provided with a positioning projection 28a at an end part thereof and has a spring which is not shown disposed on its periphery. The spring is arranged to generate a frictional force between the planet gear 26 and the planetary plate 27. A stopper 27a is provided for positioning the planet gear 26 by the planetary plate 27 in driving the cartridge chamber lid 3. stopper 27b is provided for positioning the planet gear 26 by the planetary plate 27 in feeding and transporting the film. A film transporting transmission gear 29 is arranged to mesh with the planet gear 26 in transporting the film. A transmission gear 30 is in mesh with the film transporting transmission gear 29. A driver gear 31 is provided with a gear part 31b which is in mesh with the transmission gear 30 and an engaging part 31a which is arranged to engage a spool disposed within the film cartridge (not shown).

A stopper 32 restricts the position of the above-stated planet gear 26. A friction spring 33 is interposed in between the camera body which is not shown and a flange part 32b of the stopper 32. The stopper 32 is constantly pushed against the surface of the photo-taking lens barrel 2 by the spring 33 and is thus arranged to be positioned above or below the positioning projection 28a accordingly as the photo taking-lens barrel 2 is rotated. The stopper 32 is provided with a stopper blade 32a, which is arranged, in conjunction with the positioning stoppers 27a and 27b of the planetary plate 27, to hinder the planet gear 26 from revolving about the sun gear 25 and to hold the planet gear 26 in either of two cartridge chamber lid driving positions for switching power dividing destination from one destination over to another.

A groove part 2a is provided in the surface of the photo-taking lens barrel 2 for rotation on a optical axis. The stopper blade 32a of the stopper 32 is arranged to be always above the positioning projection 28a of the planetary shaft 28 except when the groove part 2a comes right below the stopper 32. The planet gear 26 is thus rendered incapable of revolving about the sun gear 25.

The essential parts and their major actions of the film transport mechanism which is arranged in the camera of this embodiment, including a power dividing mechanism for switching the power of the first motor 4 over to a driving action on the cartridge chamber lid 3 as will be described later herein, are as described above.

Figure 4:
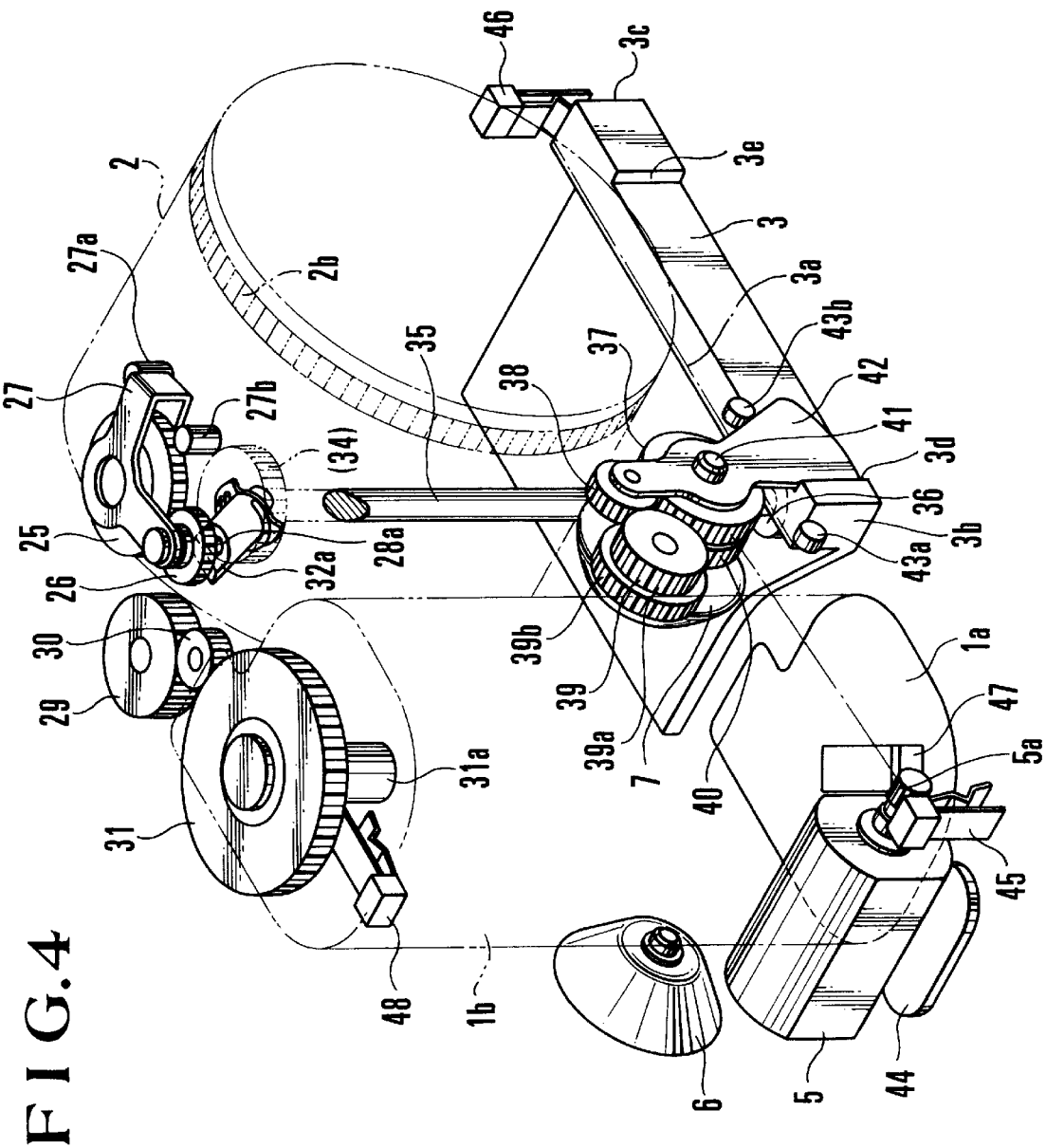
FIG. 4 is an oblique view showing a cartridge moving mechanism and a cartridge chamber lid opening-and-closing mechanism of the camera shown in FIG. 1.
Figure 5:
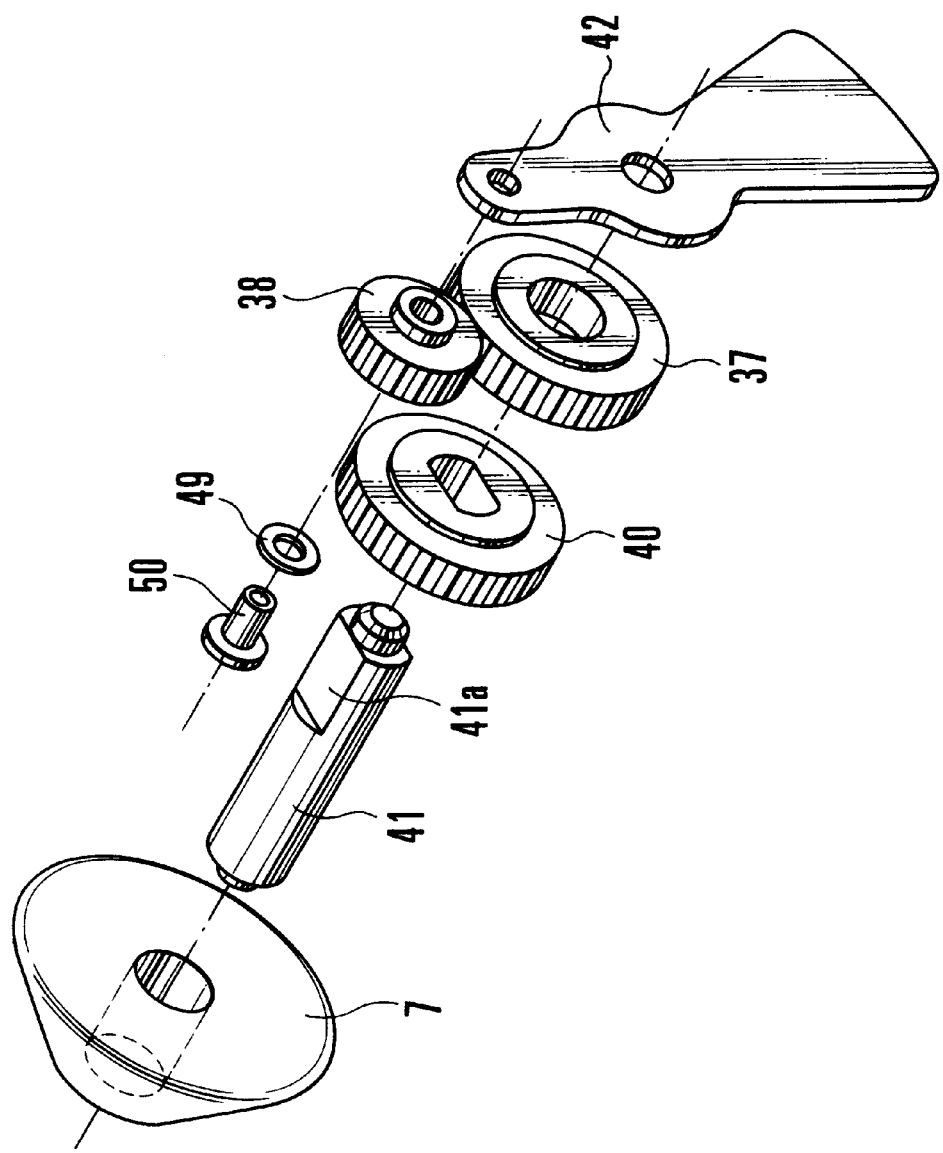
FIG. 5 is an exploded oblique view showing in detail the arrangement of a part of FIG. 4.

FIG. 4 shows in an oblique view a cartridge moving mechanism arranged to pull in a film cartridge into the cartridge chamber 1b and send the film cartridge out from the cartridge chamber 1b and a mechanism for moving the cartridge chamber lid 3 to open and close the cartridge chamber 1b. FIG. 5 shows in an exploded oblique view showing the details of a part of FIG. 4.

Referring to FIG. 4, a switch 44 is provided for automatically loading the camera with the film cartridge. The switch 44 is connected to the microcomputer 8. A second motor 5 which is shown also in FIG. 1 is arranged to serve as a drive source for driving the photo-taking lens barrel 2 and the film cartridge to pull in and send out the film cartridge. A pinion gear 5a is disposed at the fore end of the second motor 5. The power (a driving force) of the second motor 5 is transmitted via a reduction gear train which is not shown to a sun gear 37 (in the direction of a broken line arrow of FIG. 4).

FIG. 5 shows dividing destinations of the power of the second motor 5 through an exploded oblique view of a part of the power dividing mechanism which is arranged to perform switching between a destination on the side of the photo-taking lens barrel 2 and a destination on the side of the cartridge moving mechanism.

Referring to FIG. 5, a rotation shaft 41 is arranged to rotatably carry the sun gear 37. A planet gear 38 is in mesh with the sun gear 37 and is arranged to be capable of revolving about the latter. A planetary plate 42 carries the planet gear 38 in such a way as to be rotatable on a rotation shaft 50. A wave washer 49 is arranged to generate a frictional force between the planetary plate 42 and the planet gear 38. A power transmission gear 40 is arranged to engage a two-way engaging part 41a of the rotation shaft 41 and to rotate in one body with the latter. The driving roller 7 which is for moving the film cartridge as described in the foregoing with reference to FIG. 1 is made of an elastic member in a conic shape is arranged to be exposed in part to the inside of the cartridge chamber 1b. The driving roller 7 is press fitted on the rotation shaft 41 to rotate in one body with the latter.

Referring again to FIG. 4, an over-drive gear 39 consists of a gear part 39a which is arranged to mesh with the planet gear 38 and another gear part 39b which is in mesh always with the transmission gear 40. The cartridge chamber lid 3 which has already been described with reference to FIG. 1 is provided with a rack part 3a, a cartridge chamber closing end face 3b, a cartridge chamber opening end face 3c, and stoppers 3d and 3e for control over the position of the planetary plate 42. Stoppers 43a and 43b are provided on the camera body for restricting the position of the planetary plate 42 and are arranged to prevent the planet gear 38 from sticking to gears (39 and 2b) on the side of power transmission and to ensure adequate spacing between gear shafts.

In driving the driving roller 7, the planetary plate 42 is sandwiched in between the stopper 3d which is provided for preventing the planet gear from escaping and the sticking preventing stopper 43b as shown in FIG. 4. Under this condition, the planet gear 38 is in mesh with the gear part 39a of the over-drive gear 39 and is capable of making both normal and reverse rotations. Further, in driving the phototaking lens barrel 2 to rotate, the planetary plate 42 is sandwiched in between the stopper 3e which is provided for preventing the planet gear from escaping and the sticking preventing stopper 43a. Under that condition, the planet gear 38 meshes with the driving gear 2b of the photo-taking lens barrel 2 and is capable of making both normal and reverse rotations.

In the case of FIG. 4, the sun gear 25 which is included in the film transport mechanism shown in FIG. 2 is arranged as a power dividing function part for dividing the power of the first motor 4. The position of the planet gear 26 is restricted by the stopper blade 32a and the positioning projection 28a and is held in a position to mesh with the cartridge chamber lid driving transmission gear 34. In this case, the stopper 27a acts to prevent the planet gear 26 from sticking to the transmission gear 34. The stopper 32a acts to prevent the planet gear 26 from escaping.

A connection shaft 35 is arranged to transmit the power of the transmission gear 34 obtained from the first motor 4 to the cartridge chamber lid 3. A cartridge chamber lid driving gear 36 is arranged in one body with the connection shaft 35 to be always in mesh with the rack part 3a of the cartridge chamber lid 3. Therefore, the cartridge chamber lid 3 is driven to open and close the cartridge chamber 1b by the normal and reverse rotations of the cartridge chamber lid driving gear 36. When the cartridge chamber lid closing end face 3b abuts on a cartridge chamber lid closing completion detecting switch 45, the cartridge chamber 1b is completely closed with the cartridge chamber lid 3. Further, when the cartridge chamber lid opening end face 3c abuts on a cartridge chamber lid opening completion detecting switch 46, the cartridge chamber lid 3 is completely open.

A film cartridge inserting-and-sending-out detecting switch 47 is provided for detecting that a film cartridge is inserted into or sent out from the cartridge chamber 1b. A cartridge loading completion detecting switch 48 is arranged to turn on when a film cartridge is completely pulled into the cartridge chamber 1b. The driven roller 6 which has been described with reference to FIG. 1 is used for pulling in and sending out a film cartridge from the cartridge chamber. The driven roller 6 is arranged to be freely rotatable and to have no power.

When a film cartridge (now shown) is inserted into the cartridge inserting opening 1a, the cartridge inserting-and-sendig-out switch 47 is pushed and turned on by the film cartridge. Then, the microcomputer 8 shown in FIG. 1 immediately causes the second motor 5 to drive. The power (a driving force) of the second motor 5 is transmitted to the driving roller 7 via a reduction gear train which is not shown, the sun gear 37 and the planet gear 38. The film cartridge is pinched between the driving roller 7 and the driven roller 6 and is pulled further into the cartridge chamber 1b. The spool disposed within the film cartridge is fitted on a driver engaging part 31a. At the same time, an end face of the film cartridge pushes and turns on the cartridge loading completion detecting switch 48. With the switch 48 turned on, the driving action on the driving roller 7 is brought to a stop and the process of cartridge pulling-in driving comes to an end.

The arrangement of the essential parts and their main actions in the film cartridge carrying (pulling-in and sending-out) mechanism and the cartridge chamber lid opening-and-closing mechanism of the camera which is an embodiment of this invention are as described above.

FIG. 6 is a bottom view of the camera showing the positions of the cartridge chamber lid 3 and the cartridge chamber lid driving gear 36 which directly drives the cartridge chamber lid 3 as in relation to the cartridge chamber 1b.

The cartridge chamber lid driving gear 36 which is directly driving the cartridge chamber lid 3 is disposed in a part of a space A encompassing the outside shape of one end face of the cartridge chamber 1b, i.e., within a dead space of a film transporting opening shown in a lower part of the drawing, and is in mesh with the rack part 3a of the cartridge chamber lid 3. As shown in FIGS. 4, etc., despite that the power is transmitted from the film transport mechanism and the transmission gear 34 disposed in an upper part of the camera to a lower part of the camera through the connection shaft 35, the cartridge chamber lid driving gear 36 can be arranged between the photo-taking lens barrel 2 and the cartridge chamber 1b without widening the space A. Therefore, the arrangement permits reduction in size of the camera.

Further, while the cartridge chamber lid driving gear 36 is arranged to be almost completely disposed within the space A as shown in FIG. 6 in the case of this embodiment, even in case where the gear 36 must be arranged to have, for example, one half of it protruding outside of the space A due to some reason, the utilization of the space A still contributes to the reduction in size.

Figure 7A:
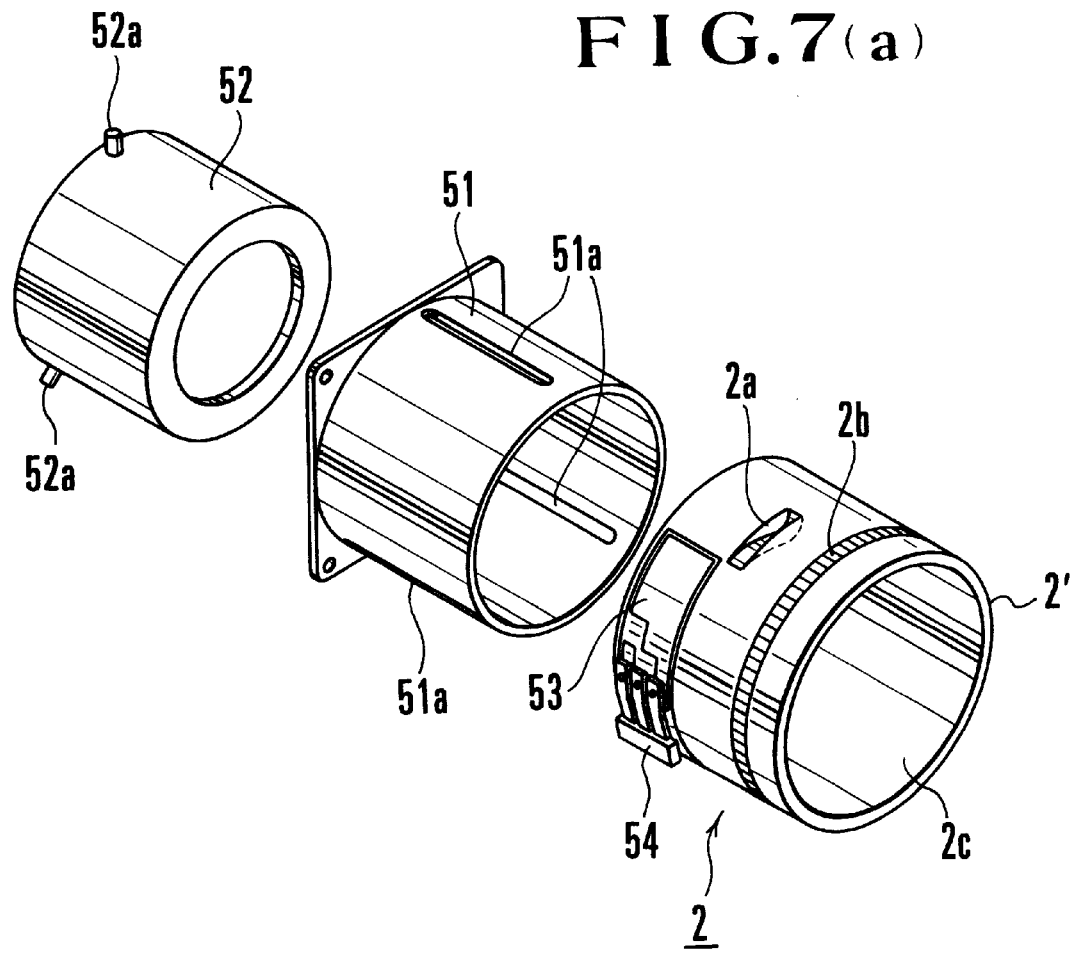
FIGS. 7(a) and 7(b) are exploded oblique views showing arrangement of a photo-taking lens barrel shown in FIG. 1, etc.
Figure 7B:
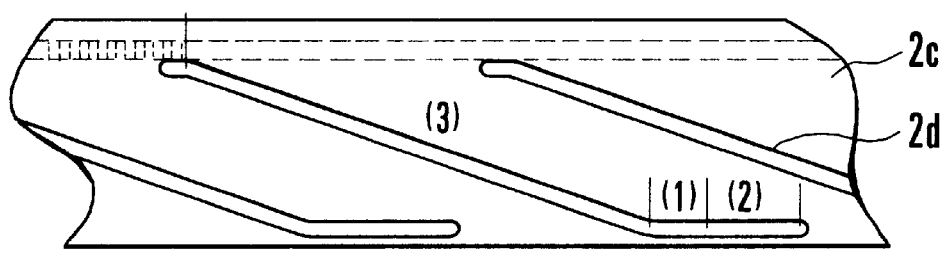

FIGS. 7(a) and 7(b) show the photo-taking lens barrel of the camera arranged as this embodiment. FIG. 7(a) is an exploded oblique view showing in outline the structural arrangement of the photo-taking lens barrel. FIG. 7(b) is a development view showing the inner side of a cam tube 2'. Referring to FIG. 7(a), the cam tube 2' is rotatably fitted on the outermost peripheral part of the photo-taking lens barrel 2. On the external surface of the cam tube 2', there are provided the above-stated groove part 2a, a gear part 2b, a flexible printed circuit board 53 for detecting the position of the cam tube 2' and a brush switch 54. A cam face 2c which is provided with cam grooves 2d is arranged on the inner side of the cam tube 2 as shown in FIG. 7(b).

The cam tube position detecting flexible printed circuit board 53 is provided with patterns arranged for positions including barrel-retracted positions (1) and (2) and a photographable position (3). The brush switch 54 is arranged to be slidable over these patterns. A signal outputted from the brush switch 54 is supplied to the microcomputer 8 (see FIG. 1) to enable it to detect each position of the photo-taking lens barrel 2. Further, the position of the photo-taking lens barrel 2 of course may be detected by some means other than the brush switch shown.

Further, the photo-taking lens barrel 2 which consists of a fixed tube 51, the cam tube 2' and a moving tube 52 is secured to the camera body. Rectilinear slots 51a are arranged on the surface of the fixed tube 51. The above-stated cam tube 2' is fitted on the outside of the fixed tube 51. The cam tube 2' is thus arranged to be rotatable only in a direction which is perpendicular to a photo-taking optical axis. The moving tube 52 is provided with a photo-taking lens, an AF shutter, etc. Reference numerals 52a denote cam followers 52a which are fitted in the rectilinear slots 51a of the fixed tube 51 and also the cam grooves 2d of the cam tube 2'. The moving tube 52 can be driven to move back and forth only in the direction of the photo-taking optical axis relative to the fixed tube 51. The position of the moving tube 52 is determined by the rotating position of the cam tube 2'.

Figure 8A:
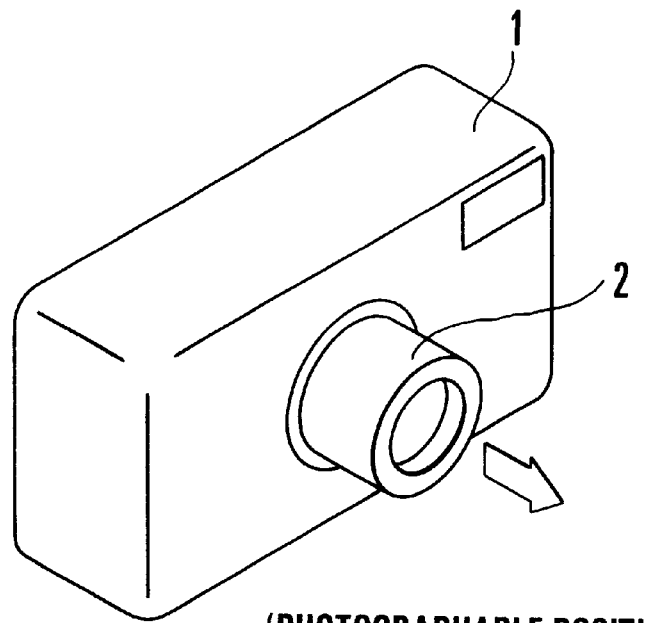
FIGS. 8(a) and 8(b) are oblique views showing the camera in a state in which the photo-taking lens barrel shown in FIG. 1, etc., is in a photographable position and in another state in which the photo-taking lens barrel is in a barrel-retracted position.
Figure 8B:
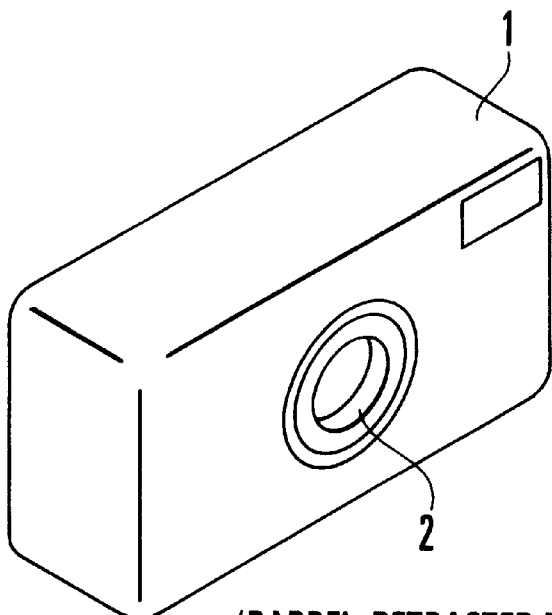

As shown in FIG. 7(b), each of the cam grooves 2d formed in the cam tube 2' includes positions (1) and (2) (corresponding to the above-stated barrel-retracted positions (1) and (2)) at which the photo-taking lens barrel can be kept in a barrel-retracted state. When the moving tube 52 is in these positions, the photo-taking lens barrel 2 is not protruding from the surface of the camera as shown in FIG. 8(b), i.e., the camera is in the barrel-retracted position. Further, when the moving tube 52 is in a photo-taking lens drawing-out position (3) which corresponds to the above-stated photographable position (3), the photo-taking lens barrel 2 protrudes from the surface of the camera to be in a photographable state as shown in FIG. 8(a).

When the cam followers 52a of the moving tube 52 are in a state of being fitted into the position (1) or (3) of the cam grooves 2d, the stopper blade 32a which is shown in FIG. 2 comes to protrude to lock the positioning projection 28a for the planet gear 26. Therefore, the planet gear 26 is held in the current switching position (on the film transport driving side or on the cartridge chamber lid driving side). In other words, a destination for which the power of the first motor 4 is to be divided is fixed. Further, when the cam followers 52a are fitted into the position (2) of the cam grooves 2d, the stopper 32 falls into the groove part 2a and is in a retracted state in which the stopper blade 32a is not locking the positioning projection 28a. Therefore, in this case, the planet gear 26 can revolve about the sun gear 25. In other words, under this condition, the power dividing destinations can be switched from one destination over to the other.

In case where the stopper blade 32a which is a part of the power dividing mechanism is to be moved back and forth by utilizing the barrel-retracted position of the photo-taking lens barrel 2 (corresponding to the positions (1) and (2) of the cam grooves 2d), this action shows almost no sign of it on the outside and thus can be done while the camera operator is unaware of it. This is an advantage of the embodiment.

Further, the position of the groove part 2a through which the stopper blade 32a is actually moved back and forth is controlled by using signals outputted from the brush switch 54 and the position detecting flexible printed circuit board 53 which are disposed on the photo-taking lens barrel 2. Therefore the stopper blade 32a can be moved back and forth without additionally arranging any position detecting switch for this purpose. That is another advantage of the embodiment.

FIGS. 9(a), 9(b) to 18(a) and 18(b) are top views and front views of the camera schematically showing the movements of essential parts of the embodiment in sequence of their actions.

Figure 9A:
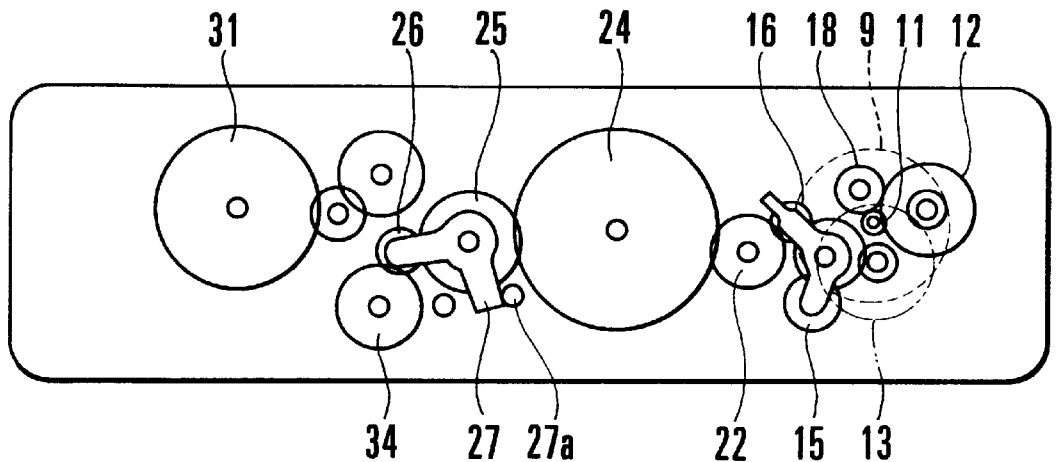
FIGS. 9(a) and 9(b) are top and front views of the camera showing the intermeshing states of various gears obtained with no film cartridge in the cartridge chamber shown in FIG. 1, etc.
Figure 9B:
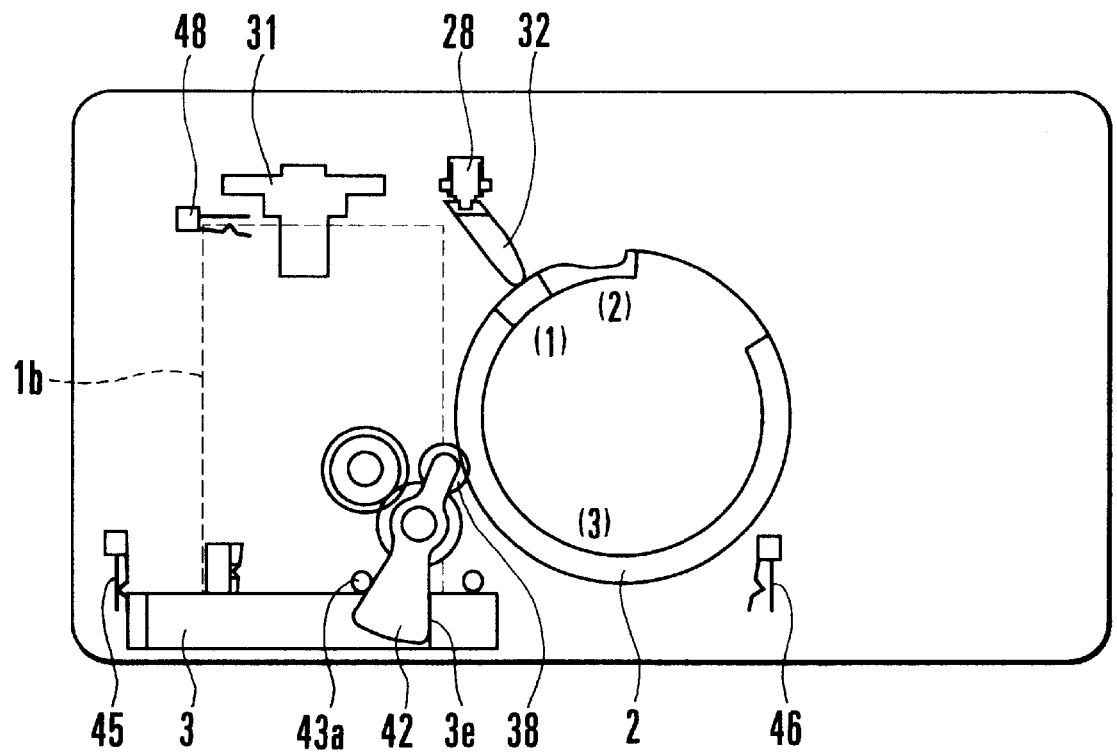

FIGS. 9(a) and 9(b) show the intermeshing states of the various gears obtained with no film cartridge existing in the cartridge chamber 1b. A reduction gear train beginning with the pinion gear 11 of the first motor 4 and ending at the sun gear 25 is in a state of intermeshing for film rewinding. The planet gear 16 is at rest in a state of meshing with the one-way gear 20. Under this condition, the planet gear 26 which is arranged to output the power of the first motor 4 is kept in mesh with the transmission gear 34 for driving the cartridge chamber lid (on the cartridge chamber lid driving side), as the positioning projection 28a is locked by the positioning stopper 32 (the stopper blade 32a) which is in a position corresponding to the position (1) of the photo-taking lens barrel 2. Since the camera is not loaded with any film cartridge in the state of FIGS. 9(a) and 9(b), it is not necessary to transport a film and no power is transmitted to the driver gear 31 which is arranged to drive the spool disposed within the film cartridge. Further, in this state, the film take-up spool which is shown in FIGS. 2, etc., would be rotated if the first motor 4 is caused to make a normal or reverse rotation. However, this causes no problem at all as the camera is not loaded with any film cartridge.

On the other hand, since the planetary plate 42 is sandwiched in between the sticking preventing stopper 43a and the escape preventing stopper 3e, the planet gear 38 which is driven by the second motor 5 is capable of transmitting a normal or reverse rotating power to the photo-taking lens barrel 2 (the gear part 2b). If the cartridge chamber lid 3 is in a closed state, therefore, the focus position or the focal length of the photo taking lens barrel 2 can be changed even if the camera is in the state of not loaded with any film cartridge.

Figure 10A:
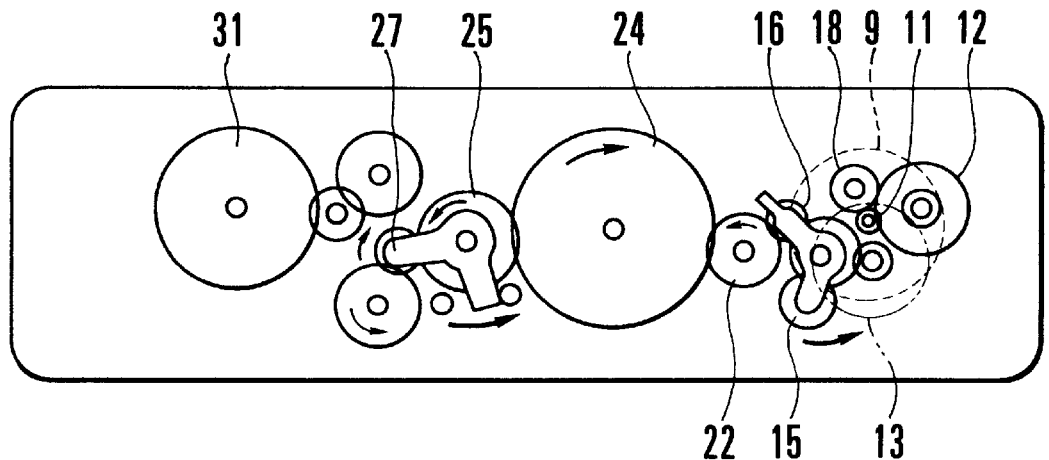
FIGS. 10(a) and 10(b) are top and front views showing the camera in a state obtained at the commencement of driving the cartridge chamber lid to open from the state of FIGS. 9(a) and 9(b).
Figure 10B:
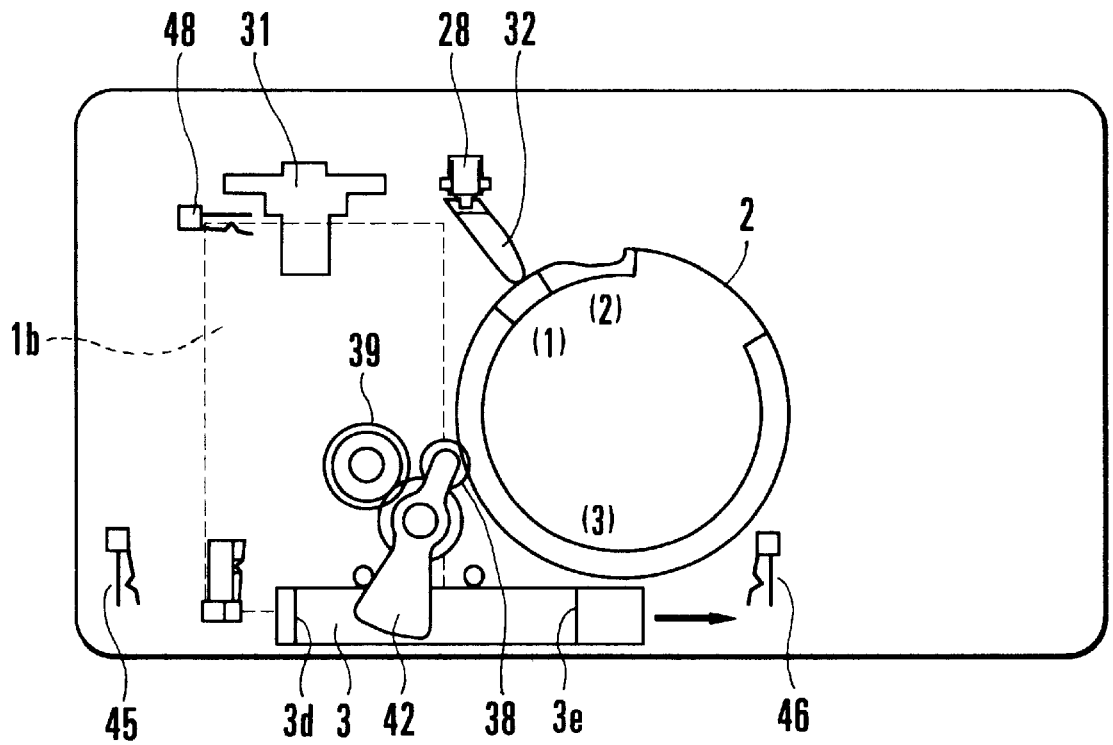

FIGS. 10(a) and 10(b) show the camera in a state obtained when the cartridge chamber lid 3 begins to open with the cartridge automatic loading switch 44 pushed. The main gears driven by the first motor 4 begin to rotate in the directions of arrows as shown in FIG. 10(a). The planetary plates 17 and 27 are caused to try to rotate by frictional forces in the directions of arrows indicated with thick lines. The power of the first motor 4 which is transmitted to the cartridge chamber lid driving transmission gear 34 is transmitted as it is to the cartridge chamber lid driving gear 36 via the connection shaft 35 shown in FIG. 4 and others and further to the rack 3a formed at the cartridge chamber lid 3. As a result, the cartridge chamber lid 3 begins to be driven in the direction of opening (arrow shown in the drawing).

Figure 11A:
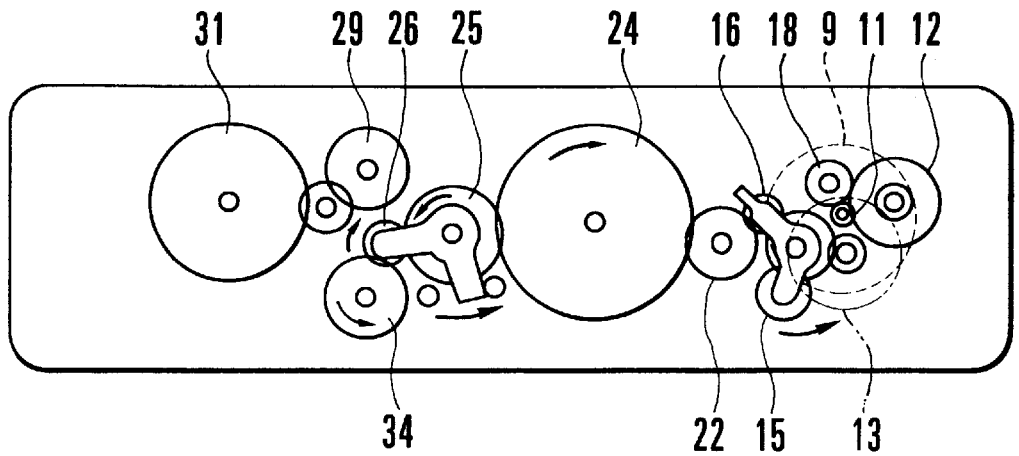
FIGS. 11(a) and 11(b) are top and front views showing the camera in a state obtained immediately before the cartridge chamber lid is fully opened from the state of FIGS. 10(a) and 10(b).
Figure 11B:
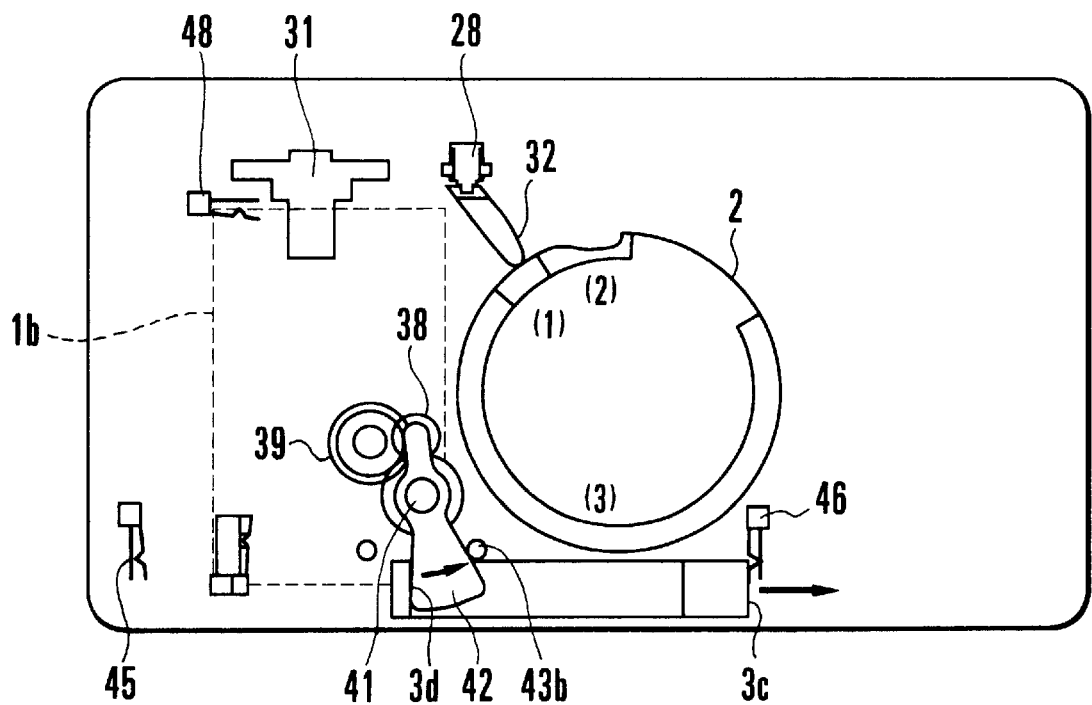

FIGS. 11(a) and 11(b) show the camera in a state obtained immediately before the cartridge chamber lid 3 is completely opened. With the cartridge chamber lid 3 continuously driven to open by the power of the first motor 4, the cartridge chamber lid opening driving action under the control of the microcomputer 8 comes to an end when the cartridge chamber lid opening end face 3c comes to push the cartridge chamber lid opening completion detecting switch 46. In this instance, the planetary plate 42 comes to abut on the escape preventing stopper 3d while the cartridge chamber lid 3 is in process of being driven to open. The planetary plate 42 then rotates in the direction of arrow on the rotation shaft 41. When the cartridge chamber lid 3 comes to a completely open position, the planetary plate 42 is sandwiched in between the sticking preventing stopper 43b and the escape preventing stopper 3d, so that the meshing state of the planet gear 38 changes from meshing with the photo-taking lens barrel 2 (the driving gear 2b) over to meshing with the over-drive gear 39. In other words, the mechanism of the planet gear 38, etc., for switching the destination of dividing the power of the second motor 5 changes from the photo-taking lens barrel driving side shown in FIGS. 10(a) and 10(b) over to the film cartridge moving side.

Therefore, a film cartridge can be driven either to pull it into or send it out by the normal or reverse rotation of the second motor 5.

Figure 12A:
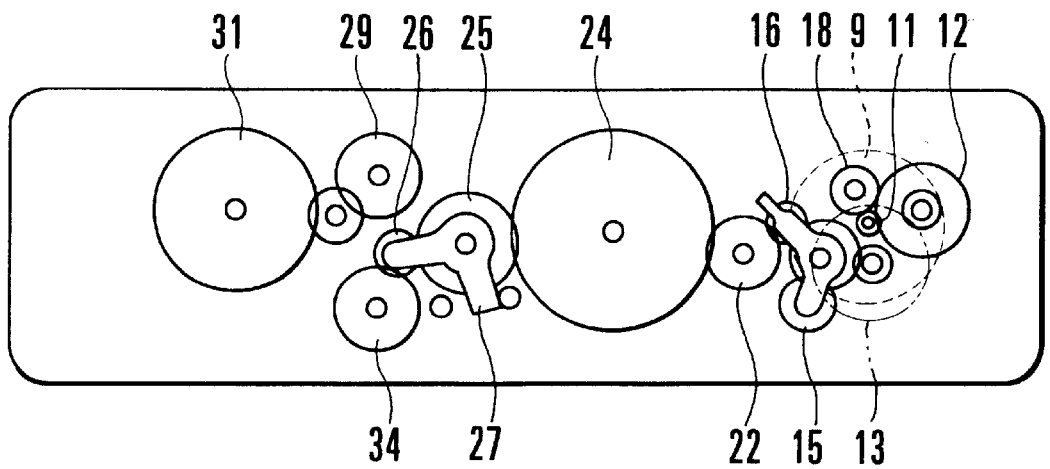
FIGS. 12(a) and 12(b) are top and front views showing the camera in a state obtained at the commencement of insertion of the film cartridge after the state shown in FIGS. 11(a) and 11(b).
Figure 12B:
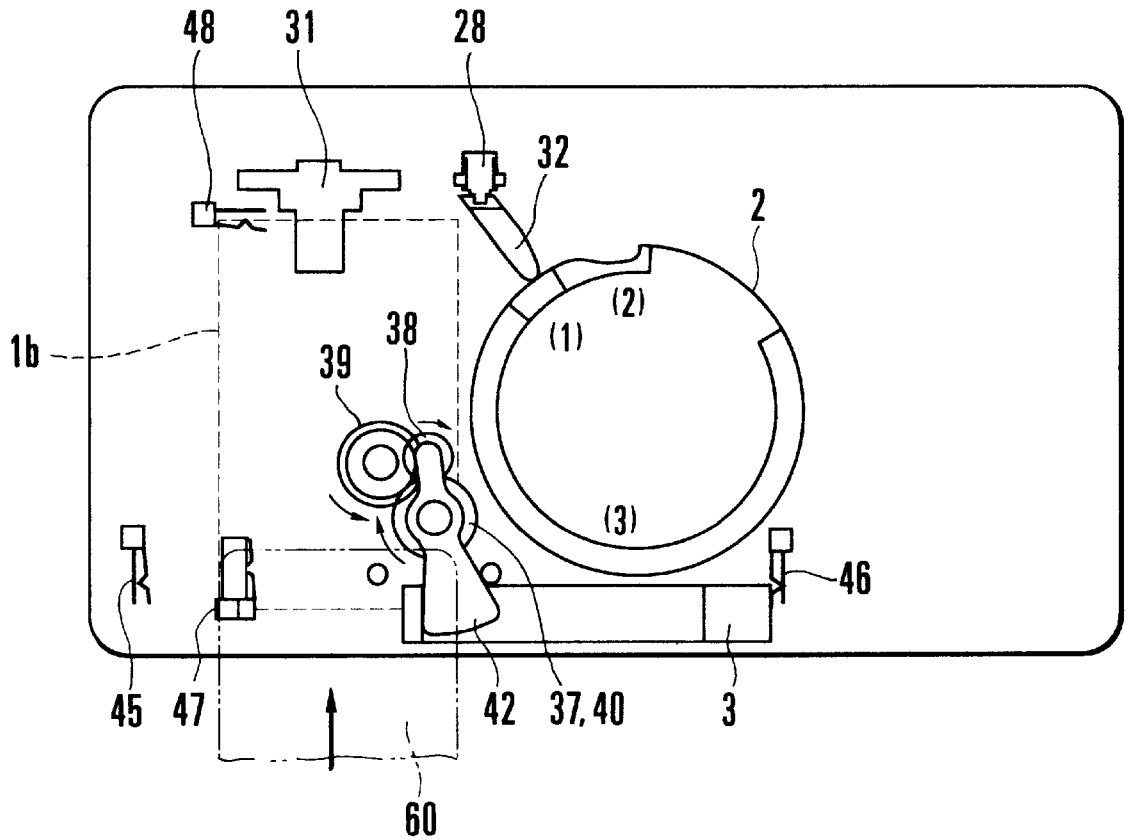

FIGS. 12(a) and 12(b) show the camera in a state obtained when the film cartridge is in process of being inserted into the cartridge inserting opening 1a after the cartridge chamber lid 3 is completely opened.

The cartridge chamber lid 3 driven by the first motor 4 is at rest as it is already completely open. In this state, when the film cartridge 60 is inserted into the cartridge inserting opening 1a which is open, the film cartridge inserting-and-sending-out detecting switch 47 is pushed to generate a signal. The signal thus generated is transmitted to the microcomputer 8 shown in FIG. 1. The microcomputer 8 then causes the second motor 5 to be driven. The sun gear 37, the planet gear 38, the over-drive gear 39 and the driving gear 40 respectively come to rotate in the directions of arrows shown. Therefore, in this instance, the driving roller 7 (see FIG. 5) which is arranged to act to pull in the film cartridge 60 comes to rotate. The film cartridge 60 is automatically pulled in.

Figure 13A:
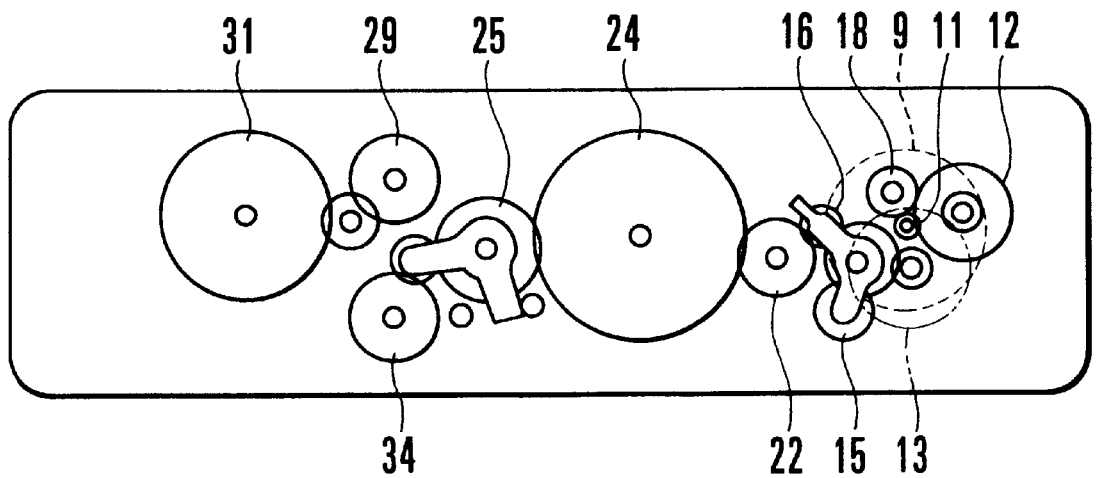
FIGS. 13(a) and 13(b) are top and front views showing the camera in a state obtained upon completion of loading the camera with the film cartridge after the state shown in FIGS. 12(a) and 12(b).
Figure 13B:
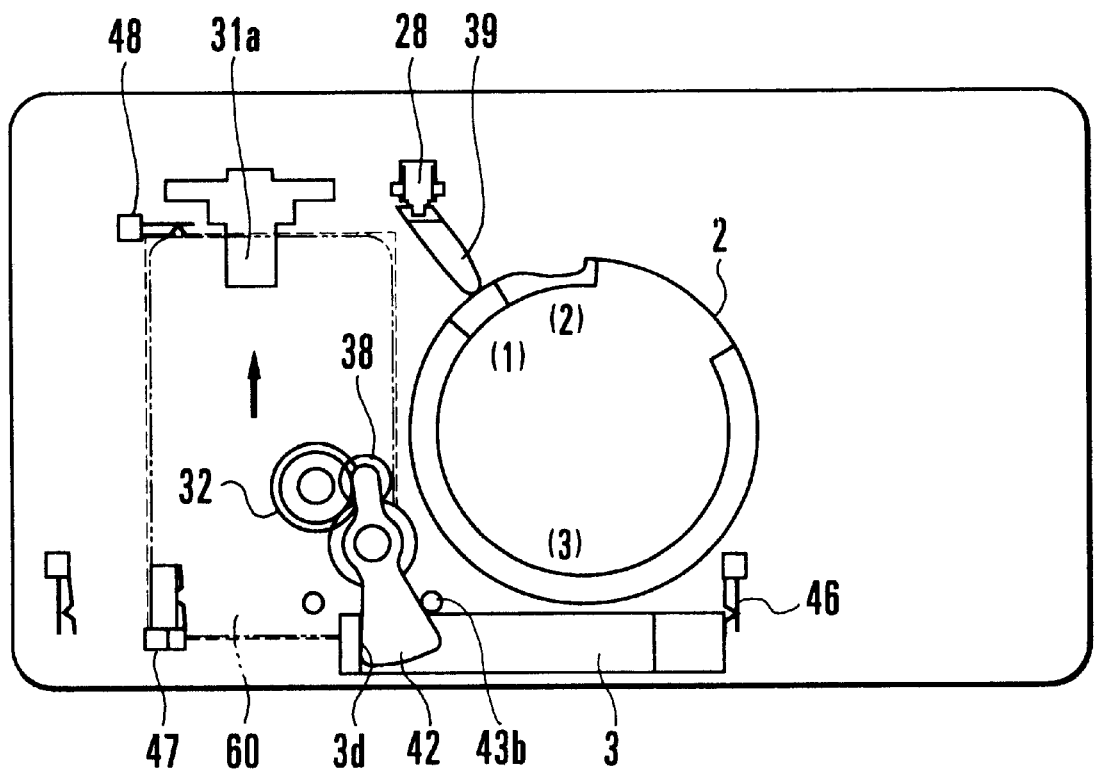

FIGS. 13(a) and 13(b) show the camera in a state obtained immediately after the film cartridge 60 is completely loaded within the cartridge chamber 1b.

With the film cartridge 60 pulled in by the second motor 5, the spool which is disposed within the film cartridge 60 eventually come to be fitted on the engaging part 31a of the driver gear 31 disposed on the side of the camera. At almost the same time, the cartridge loading completion detecting switch 48 is pushed to turn on by an end face of the film cartridge 60. With the switch 48 turned on, the microcomputer 8 causes the second motor 5 to stop driving and the pulling in driving action on the film cartridge 60 comes to an end.

Figure 14A:
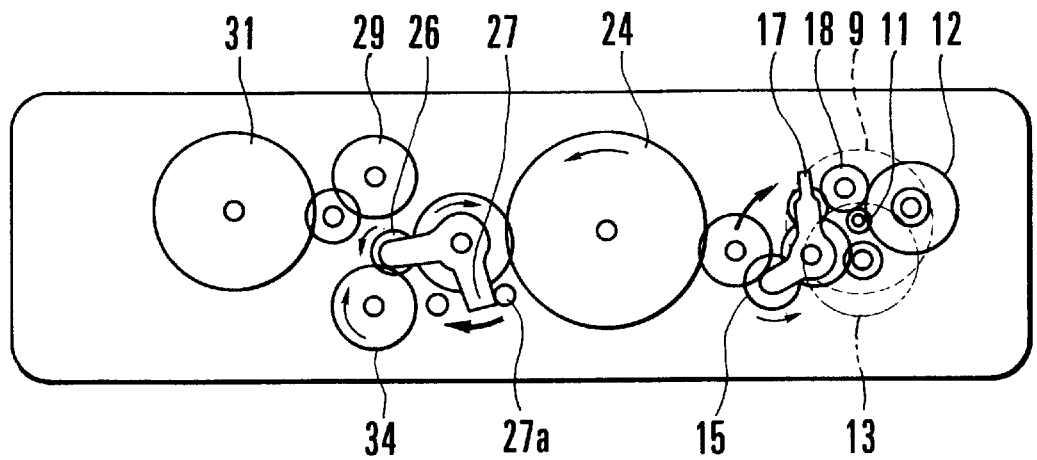
FIGS. 14(a) and 14(b) are top and front views showing the camera in a state obtained at the commencement of driving the cartridge chamber lid to close after the state shown in FIGS. 13(a) and 13(b).
Figure 14B:
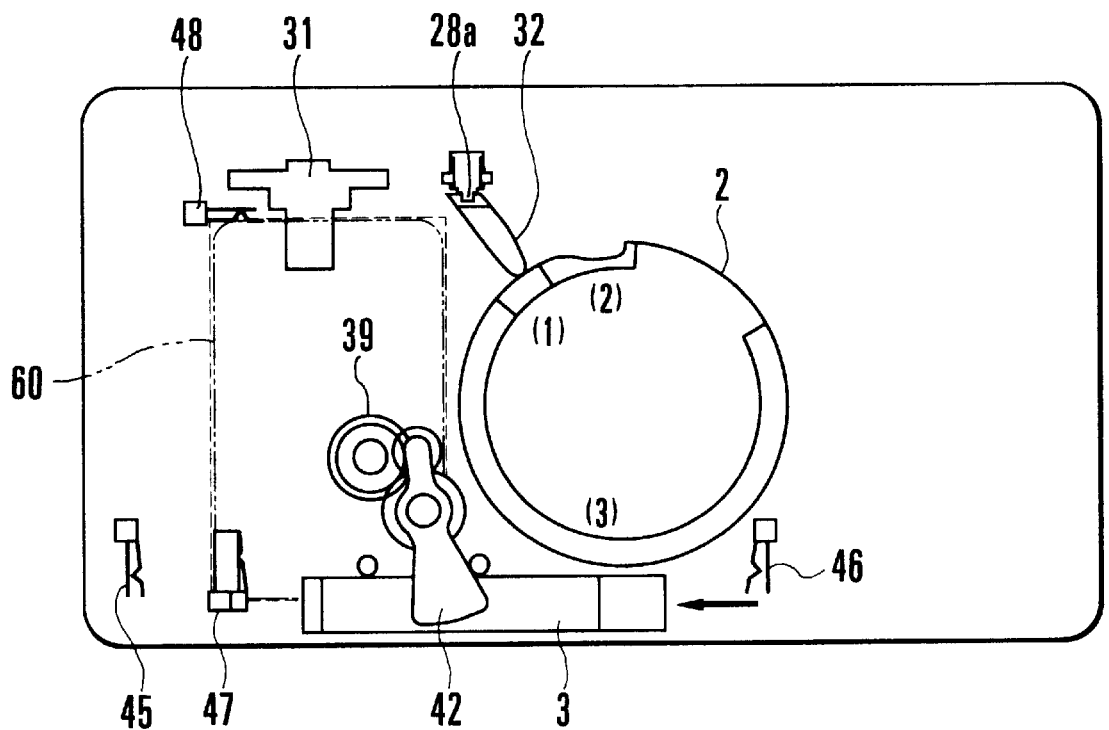

FIGS. 14(a) and 14(b) show the camera in a state obtained immediately after commencement of driving the cartridge chamber lid 3 to close the cartridge chamber with the film cartridge loading completion signal having been transmitted to the microcomputer 8. At this time, the film cartridge pulling in driving action by the second motor 5 has already come to a stop as the camera is completely loaded with the film cartridge 60.

On the other hand, with the cartridge loading completion detecting switch 48 tuned on, the microcomputer 8 causes the first motor 4 to be driven. Then a closing driving action on the cartridge chamber lid 3 begins. In this case, the rotating directions of the main gears are as shown in FIGS. 14(a) and 14(b). The planet gear 15 comes to mesh with the one-way gear 21 to give the effect of one-way clutch. In the case of this embodiment, even if the moving speed of the cartridge chamber lid 3 being driven to close is increased with a finger or the like by cutting off the clutch, there arises no problem, because the clutch is immediately connected when the cartridge chamber lid 3 comes to a stop.

Meanwhile, the planetary plate 27 tries to swing in the direction of arrow shown in FIGS. 14(a) and 14(b) in an attempt to bring the planet gear 26 into a state of meshing with the film transporting transmission gear 29 by separating it from the cartridge chamber lid driving transmission gear 34. However, since the planet gear positioning projection 28a is locked by the positioning stopper 32 and the planetary plate 27 is abutting on the sticking preventing stopper 27a as shown, the planet gear 26 is kept in mesh with the cartridge chamber lid driving transmission gear 34. In other words, the positioning stopper 32 which is provided on the photo-taking lens barrel 2 as a part of the power dividing (transmitting) destination switching mechanism arranged to transmit the power of the first motor 4 either to the film transport driving side or to the cartridge chamber lid driving side is in a position to lock the planet gear positioning projection 28a, because the photo-taking lens barrel 2 is in the barrel-retracted position. Therefore, the power dividing destination is retained on the cartridge chamber lid driving side even if the first motor 4 rotates in the direction of changing the power dividing destination to the film transport driving side.

Figure 15A:
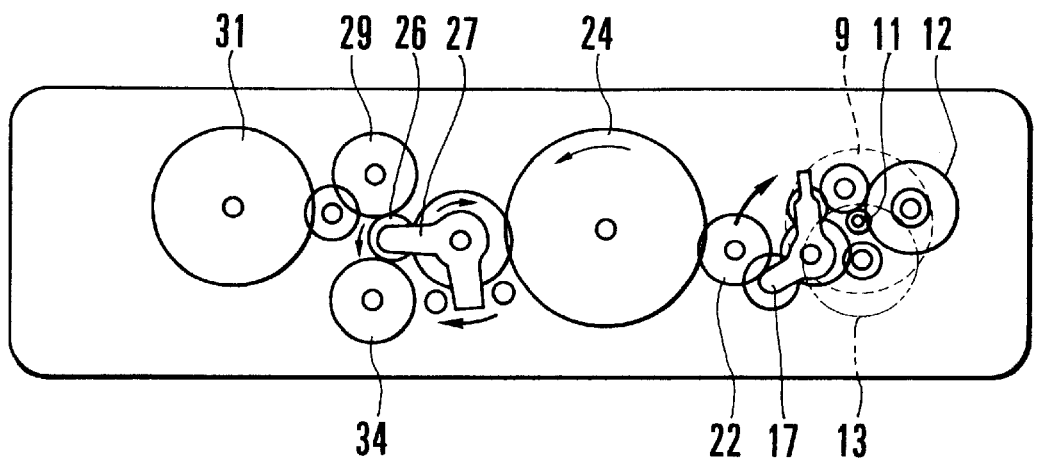
FIGS. 15(a) and 15(b) are top and front views showing the camera in a state obtained immediately after completion of closing of the cartridge chamber lid after the state shown in FIGS. 14(a) and 14(b).
Figure 15B:
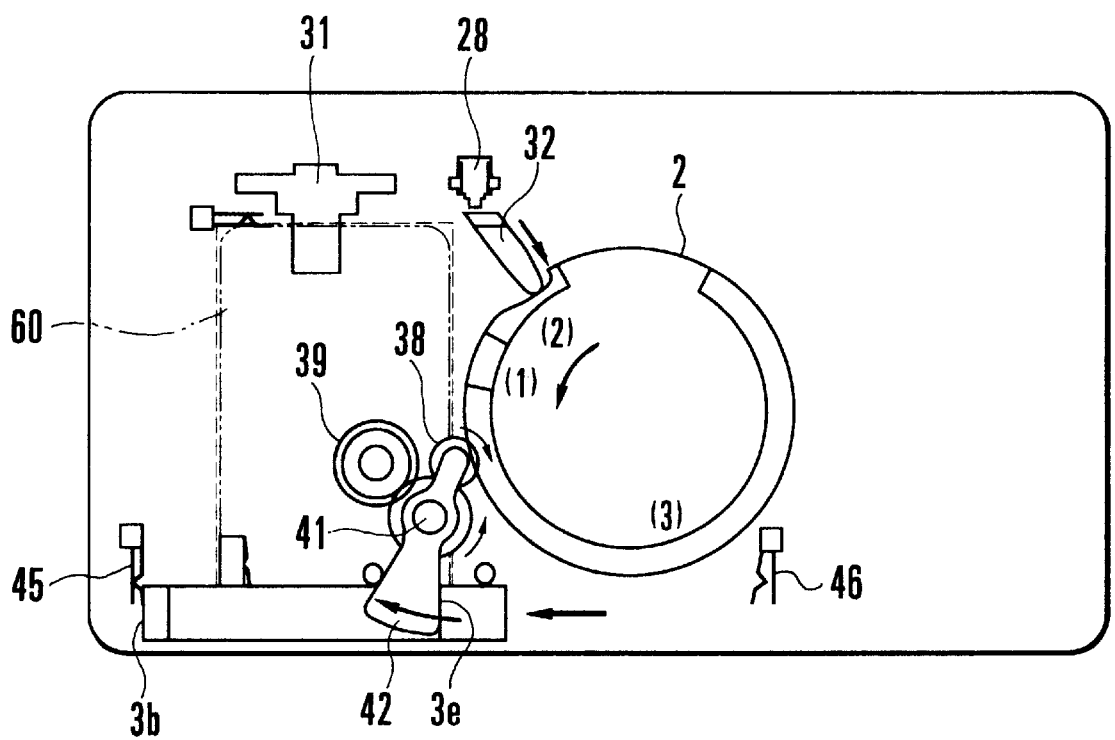

FIGS. 15(a) and 15(b) shows the camera in a state obtained immediately after completion of driving the cartridge chamber lid 3 to close after the film cartridge 60 is loaded.

With the cartridge chamber lid 3 driven to close with the first motor 4, the cartridge chamber lid closing end face 3b comes to push and turn on the cartridge chamber lid closing completion detecting switch 45. Then the microcomputer 8 immediately causes the second motor 5 to be driven. This causes the photo-taking lens barrel 2 to be moved from the barrel-retracted position (1) to the barrel-retracted position (2) for the following reason While the cartridge chamber lid 3 is in process of being closed, the planetary plate 42 abuts on the escape preventing stopper 3e to be caused to swing on the rotation shaft 42. The position of the planet gear 38 then changes from the over-drive gear 39 over to the photo-taking lens barrel side. After that, upon completion of closing of the cartridge chamber lid 3, the planetary plate 42 is sandwiched in between the escape preventing stopper 3e and the sticking preventing stopper 43a to keep the planet gear 38 in mesh with the photo-taking lens barrel 2. In other words, a destination switching mechanism for switching the destination of dividing (transmitting) the power of the second motor 5 is switched from the film cartridge moving side over to the photo-taking lens barrel driving side and is kept in that state. As a result, the second motor 5 is set in a state in which it can make both normal and reverse rotations.

The driving action of moving the cartridge chamber lid 3 in the direction of closing it by the first motor 4 is carried on even after completion of closing of the cartridge chamber lid 3. Therefore, the photo-taking lens barrel 2 is moved to the position (2) immediately after completion of driving the cartridge chamber lid 3 in the closing direction. The planetary plate 27 is allowed to begin to swing to the film transporting transmission gear 29 immediately after the positioning stopper 32 is retracted by the friction spring 33 in the direction of arrow shown in FIG. 15(b). This is, of course, because the positioning stopper 32 which is disposed at a part of the photo-taking lens barrel 2 is disengaged from the planet gear positioning projection 28a by the movement of the photo-taking lens barrel 2 to the position (2) and the power of the first motor 4 is thus allowed to act as a force of rotating the planet gear 26 in the direction of the arrow shown in FIG. 15(a).

Further, the driving by the first motor 4 may be arranged to be temporarily stopped for a period during which the photo-taking lens barrel 2 is moved from the position (1) to the position (2) immediately after completion of closing of the cartridge chamber lid 3. However, such arrangement is not desirable for smooth change-over of the power dividing destination as it takes a longer period of time.

Figure 16A:
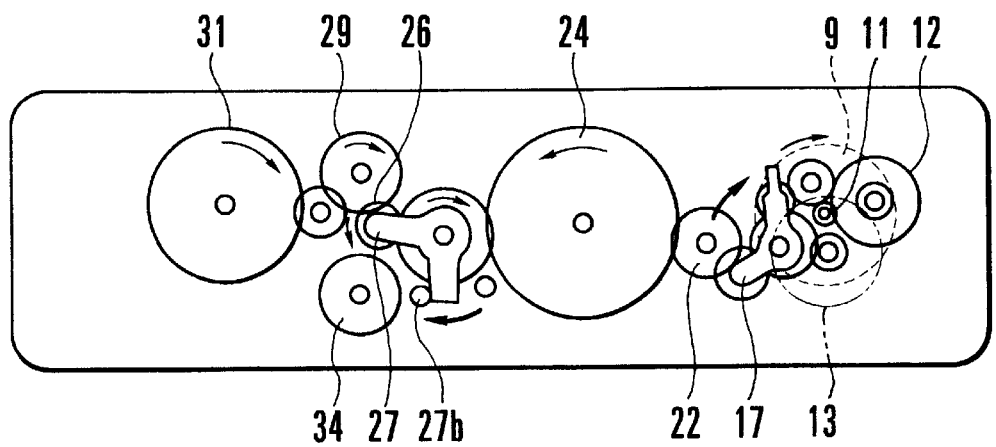
FIGS. 16(a) and 16(b) are top and front views showing the camera in a state obtained at the commencement of film blank feeding after the state shown in FIGS. 15(a) and 15(b).
Figure 16B:
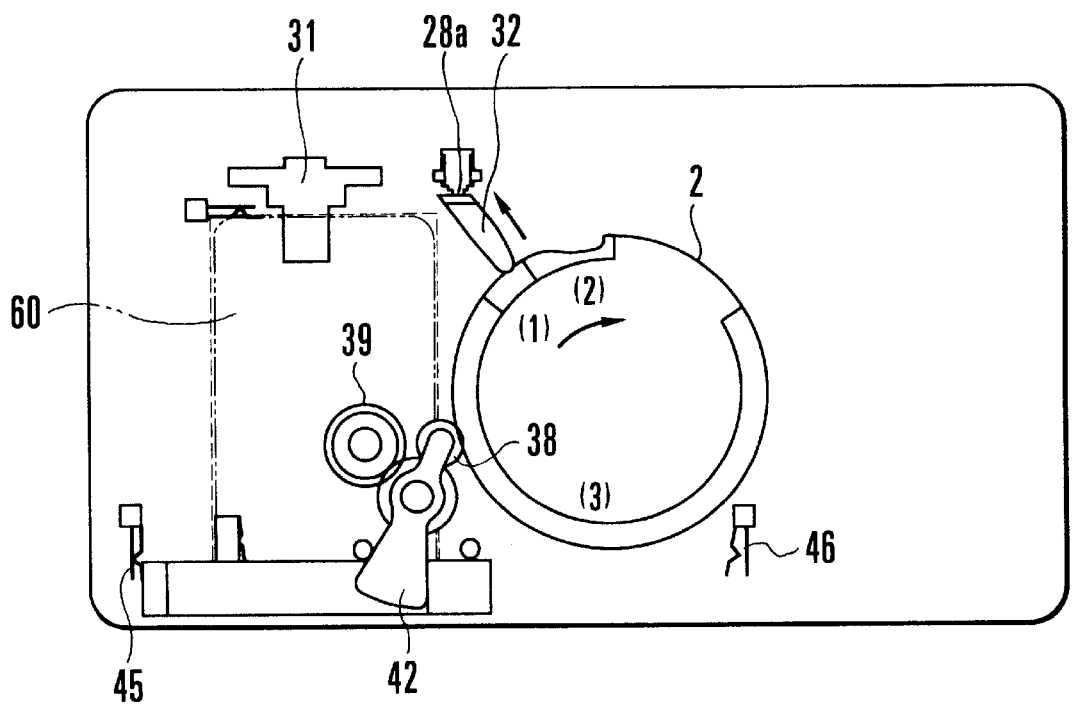

FIGS. 16(a) and 16(b) show the camera in a state obtained when the film is wound up to a position where the film becomes usable for photographing (the end of blank feeding of film) after the film cartridge 60 is loaded and the cartridge chamber lid 3 is closed.

A predetermined period of time $t_0$ which is sufficiently long for changing the meshing position of the planet gear 26 from the cartridge chamber lid driving transmission gear 34 over to the film transport driving transmission gear 29 is counted by a timer disposed within the microcomputer 8. After the lapse of this period of time, the second motor 5 is caused to drive the photo-taking lens barrel 2 to move from the position (2) back to the position (1). Therefore, the planet gear 26 is prevented from escaping the film transport driving transmission gear 29 as the positioning projection 28a is locked by the positioning stopper 32. Further, since the planetary plate 27 abuts on the sticking preventing stopper 27b, both normal and reverse turning forces can be transmitted to the film transport driving transmission gear 29.

When the planet gear 26 meshes with the film transport driving transmission gear 29, the driver gear 31 begins to rotate in the direction of arrow. The film is moved out from the film cartridge 60, passes between an aperture and a pressure plate (not shown) and comes to be wound up on the film take-up spool 9 which has already begun to rotate for film winding. When the microcomputer 8 confirms, through film position detecting means or means for counting the number of film frames which is not shown, that the film has been wound up to a photographable position, the first motor 4 is stopped from driving and the film winding driving action comes to an end, that is, the process of film blank feeding is finished.

Meanwhile, since the planet gear 38 is always in mesh with the photo-taking lens barrel 2, the position of the photo-taking lens barrel 2 can be selected as desired, in the same manner as the conventional arrangement, because any of the positions (1) and (3) are usable.

Figure 17A:
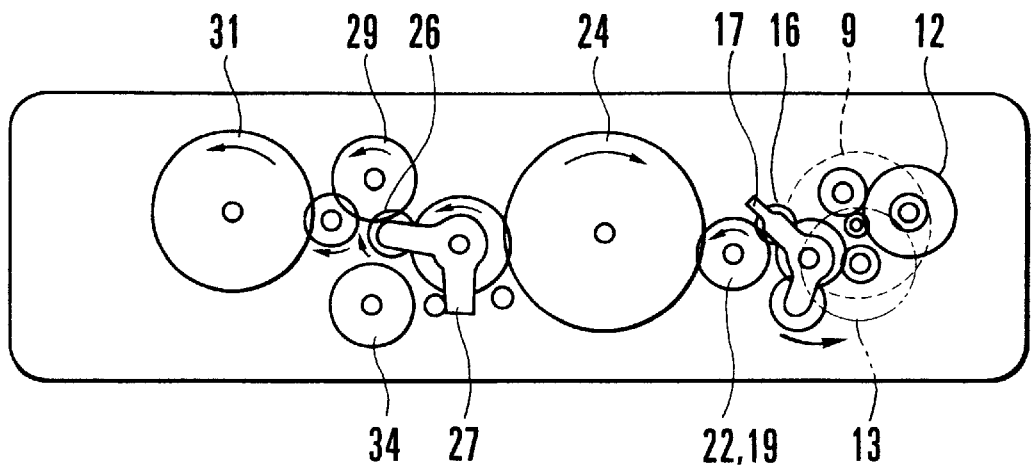
FIGS. 17(a) and 17(b) are top and front views showing the camera in a state obtained at the commencement of film rewinding after completion of photographing in the state shown in FIGS. 16(a) and 16(b).
Figure 17B:
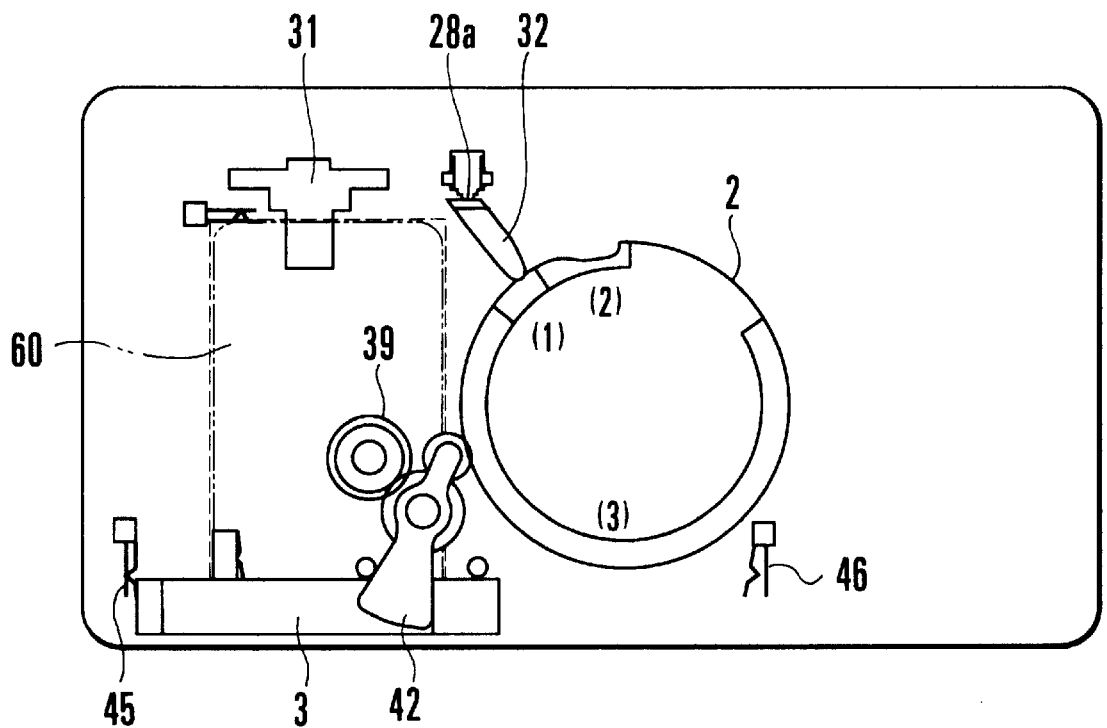

FIGS. 17(a) and 17(b) show the camera in a state obtained in rewinding film transportation either after all the prescribed number of frames of film have been used for photographing or when a forced rewinding switch which will be described later is pushed.

In this instance, the power of the first motor 4 is transmitted to cause the main transport gears to rotate in the directions which are as shown in FIG. 17(a). The planet gear 16 meshes with the one-way clutch 19 to transmit the power without passing through the clutch mechanism. Further, in this instance, the planetary plate 27 receives a force of turning it in the direction of changing the meshing position of the planet gear 26 from the film transport driving transmission gear 29 over to the cartridge chamber lid driving transmission gear 34. However, since the planet gear positioning projection 28a is locked by the positioning stopper 32 as shown in the drawing, the planet gear 26 remains in mesh with the film transport driving transmission gear 29. Therefore, the power of the first motor 4 is transmitted to the driver gear 31 to cause the film to be continuously rewound back into the film cartridge 60. When it is confirmed through the film position detecting means that the film has been completely rewound and stowed within the film cartridge 60, the microcomputer 8 causes the first motor 4 to stop driving and film rewinding driving comes to an end.

Figure 18A:
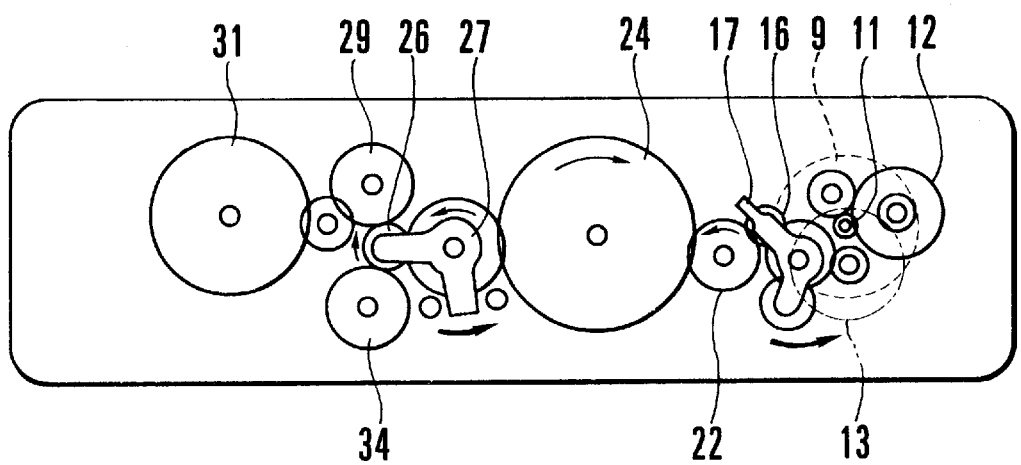
FIGS. 18(a) and 18(b) are top and front views showing the camera in a state obtained immediately before commencement of sending out the film cartridge after completion of film rewinding in the state shown in FIGS. 17(a) and 17(b).
Figure 18B:
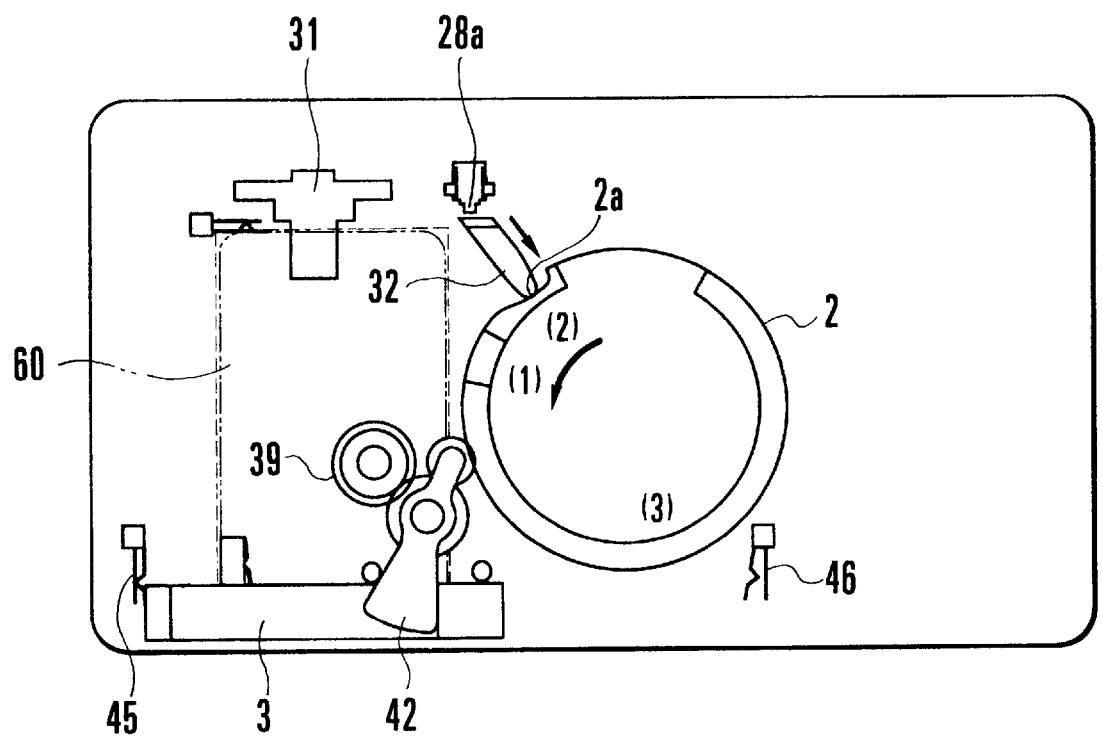

FIGS. 18(a) and 18(b) show the camera in a state obtained immediately before commencement of sending the film out from the film cartridge 60 when the automatic cartridge loading switch 44 is pushed. With the automatic cartridge loading switch 44 pushed, the microcomputer 8 causes the second motor 5 to begin driving to change the position of the photo-taking lens barrel 2 from the position (1) to the position (2). At about the same time, the first motor 4 is caused to begin driving to open the cartridge chamber lid 3.

When the photo-taking lens barrel 2 is moved to the position (2), the positioning stopper 32 which has been urged by a spring falls into the groove part 2a and thus comes to a position where the planet gear positioning projection 28a is not locked. This enables the position of the planet gear 26 to which the power of the first motor 4 is transmitted in the direction of opening the cartridge chamber lid 3 to be changed from the film transport driving gear 29 over to the cartridge chamber lid driving gear 34. The period of time $t_0$ which is sufficiently long for allowing the position of the planet gear 26 to change from the film transport driving gear 29 over to the cartridge chamber lid driving gear 34 is counted by the timer which is disposed within the microcomputer 8. After the lapse of this period of time, the second motor 5 is caused to reversely rotate in such a way as to move the photo-taking lens barrel 2 from the position (2) back to the position (1). As a result, the camera assumes the state shown in FIGS. 9(a) and 9(b).

After that, the cartridge chamber lid 3 is driven to open. This driving action continues until the position of the cartridge chamber lid 3 changes from the position shown in FIGS. 9(a) and 9(b) to a completely open position, so that the change-over of the power dividing (transmitting) destination can be smoothly carried out without being interrupted by the position of the planet gear positioning stopper 32.

The circuit arrangement of the camera which performs the actions described above is as follows Since a film cartridge sending-out driving action and a cartridge chamber lid closing driving action are apparent from what is shown in combinations in FIGS. 9(a) and 9(b) to 18(a) and 18(b) and a difference in direction of the rotations of the first and second motors 4 and 5, the details of these actions are omitted from the following description.

FIG. 19 is a circuit block diagram showing the arrangement of essential parts of the camera of FIG. 1. Referring to FIG. 19, a microcomputer 1701 corresponds to the microcomputer 8 of FIG. 1 and is arranged to control actions of varied kinds of the camera. The microcomputer 1701 includes a time control means 1702 which consists of a timer or a counter, etc., and is disposed within the microcomputer 1701. The circuit arrangement includes a main power supply switch 1703 (a main switch), a release switch 1704 which is provided for causing a release action to begin, an automatic cartridge loading switch 1705 which corresponds to the automatic cartridge loading switch 44 shown in FIG. 4, etc., a forced rewinding switch 1706 which is to be used in the event of forcibly rewinding the photographing film, and a focal length varying switch 1707 which is provided for varying the focal length of the photo-taking lens barrel 2 if the camera is of the focal length variable type.

A photographing circuit 1708 is arranged to carry out distance measuring, focus adjusting, diaphragm driving and light measuring actions. A motor 1709 is for driving a shutter. A motor 1710 is a motor corresponding to the first motor 4 shown in FIG. 1, etc. A motor driving circuit 1711 is arranged to drive the motor 1710 under the control of the microcomputer 1701. The power of the motor 1710 is used for film transport driving such as film winding and film rewinding and for driving the cartridge chamber lid 3 to open and close. A motor 1712 corresponds to the second motor 5 shown in FIG. 1, etc. A motor driving circuit 1713 is arranged to drive the motor 1712 under the control of the microcomputer 1701. The power of the motor 1712 is used for driving and moving the photo-taking lens barrel 2 (to the positions (1), (2) and (3) and for driving and moving the film cartridge 60 to pull it inward and to send it out.

A cartridge chamber lid position detecting circuit 1714 is arranged to detect whether the cartridge chamber lid 3 is in a position where it is completely open or closed or in an intermediate position. The cartridge chamber lid position detecting circuit 1714 includes the cartridge chamber lid closing completion detecting switch 45 and the cartridge chamber lid opening completion detecting switch 46 mentioned in the foregoing.

A cartridge loading position detecting circuit 1715 is arranged to detect the position of the film cartridge 60 within the camera to find whether the film cartridge 60 has been inserted to a position where it can be pulled in by the driving roller 7, or has been completely loaded within the cartridge chamber 1b or it can be send out to a position where it can be taken out by the user of the camera. The cartridge loading position detecting circuit 1715 includes the film cartridge insertion-and-sending-out detecting switch 47 and the film cartridge loading detecting switch 48.

A cartridge light-blocking detecting circuit 1716 is arranged to detect whether the film cartridge 60 is in a safe state in which the film has been completely rewound within the camera and a necessary portion of the film will never be exposed to light within the camera even if the cartridge chamber lid 3 is opened. In other words, the circuit 1716 is composed of a film position detecting circuit and a film frame number detecting circuit, etc.

Figure 20:
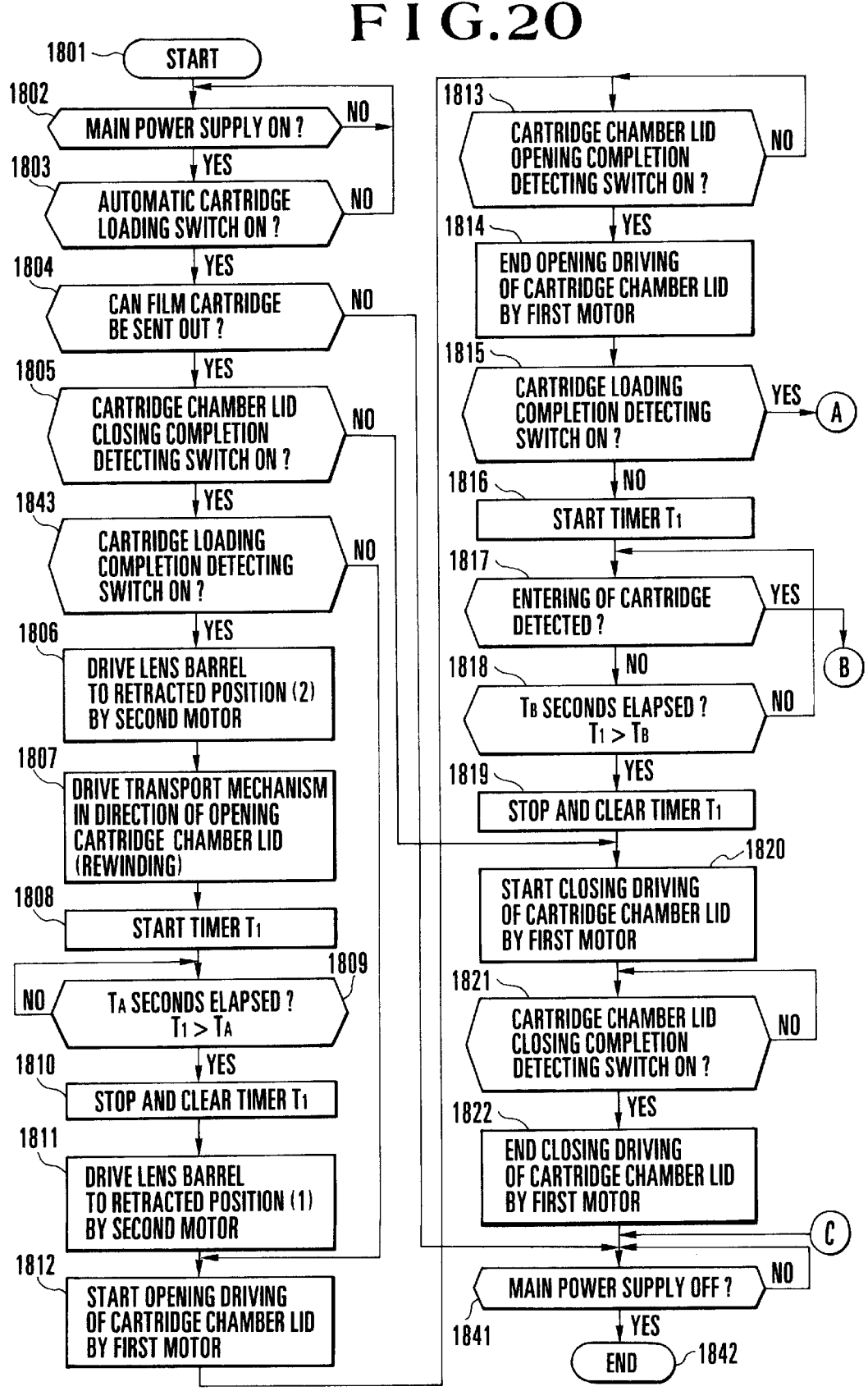
FIG. 20 is a flow chart showing a part of operation of a microcomputer shown in FIGS. 1 and 19.
Figure 21A:
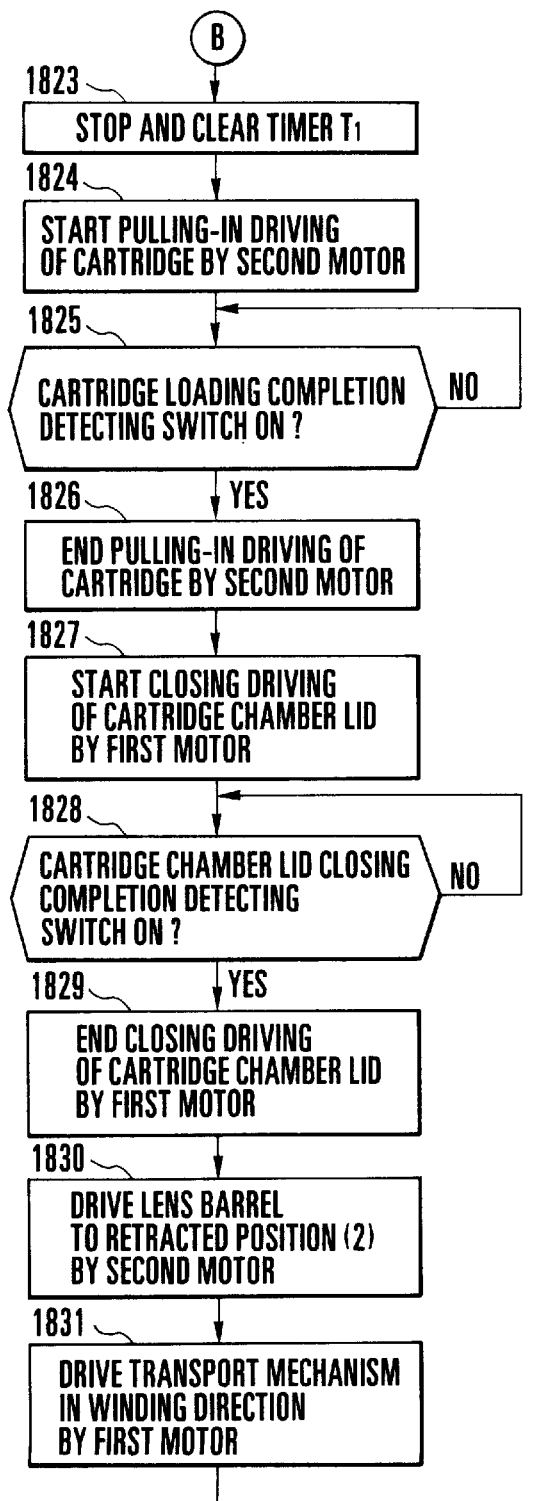
FIGS. 21(a) and 21(b) are flow charts showing parts of the operation shown in FIG. 20.
Figure 21B:
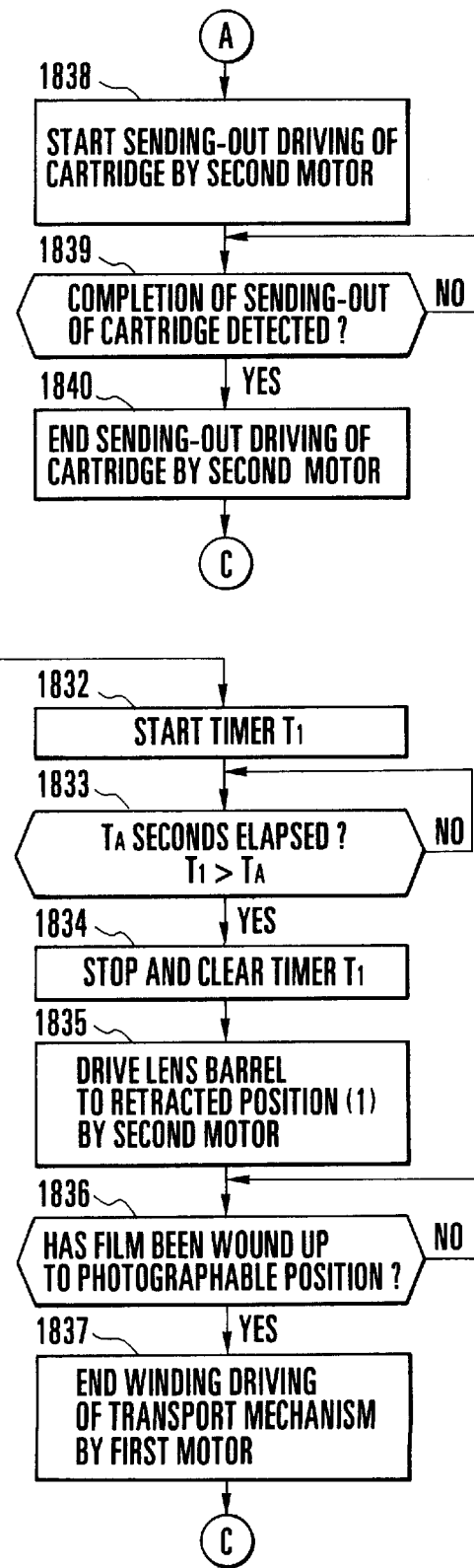
Figure 22A:
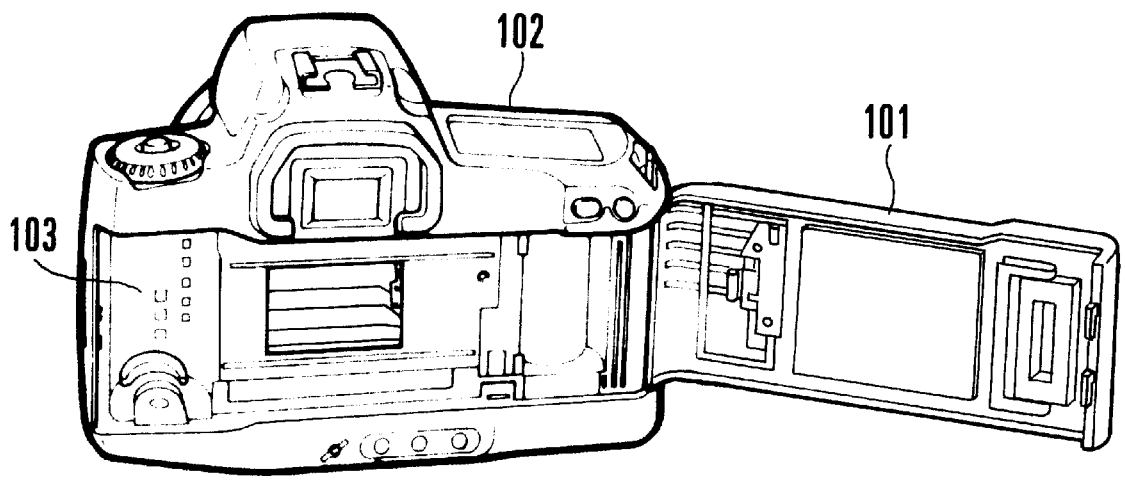
FIGS. 22(a) and 22(b) are oblique views showing the conventional camera in a state of being loaded with a film cartridge and as viewed from the rear side thereof.
Figure 22B:
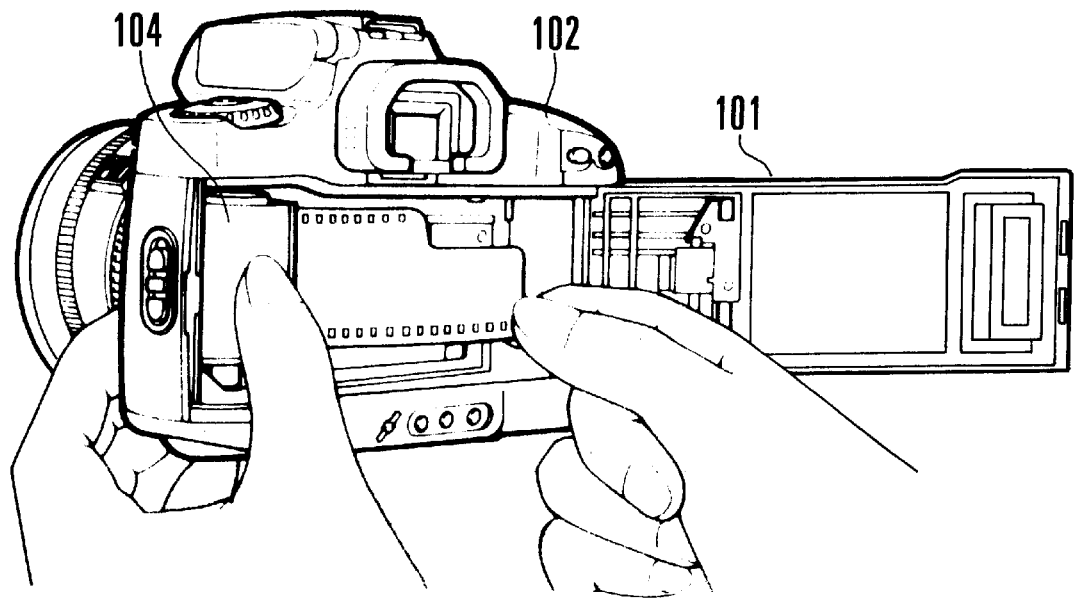
Figure 23:
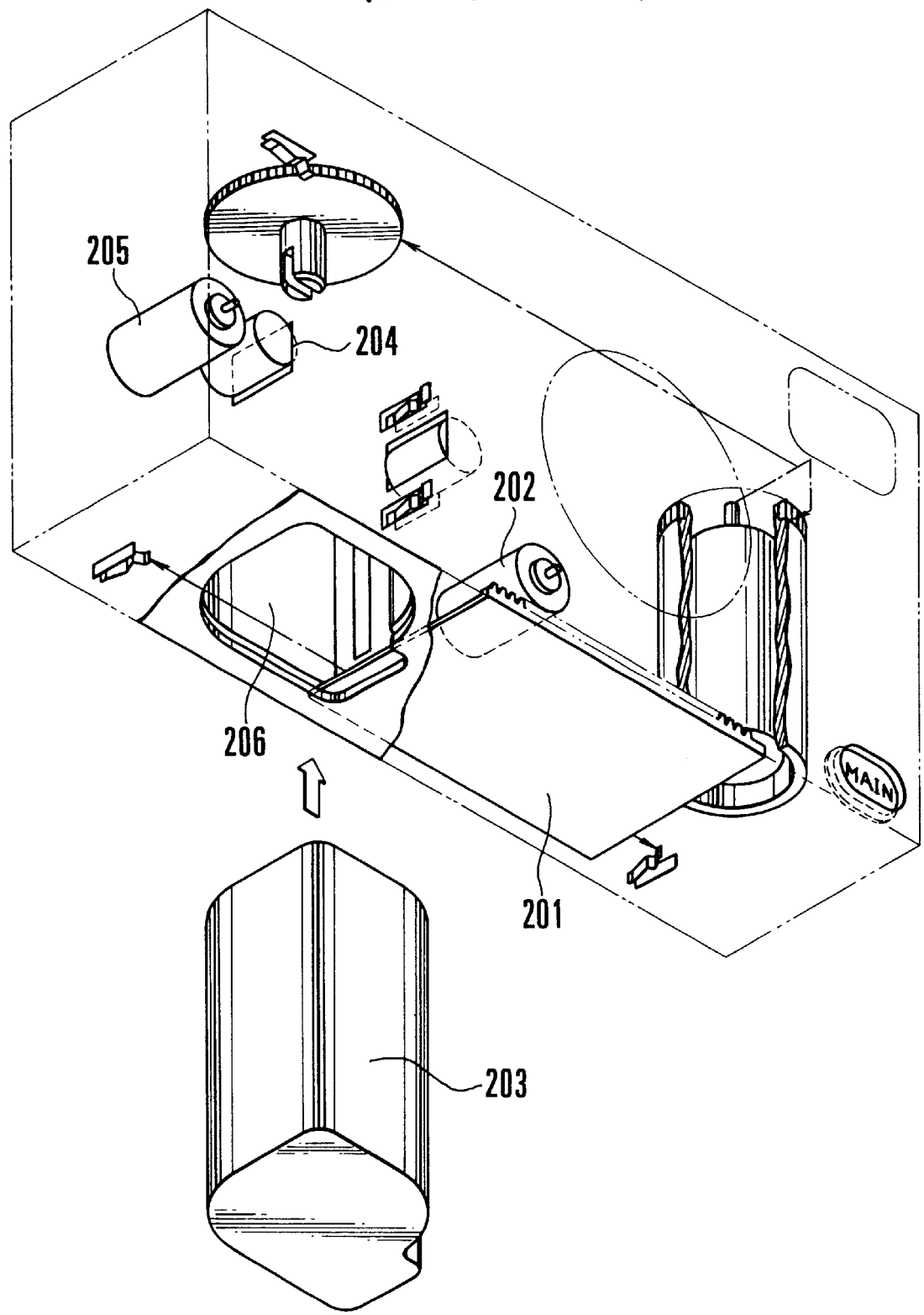
FIG. 23 is an oblique view showing another camera in a state of being loaded with a film cartridge and as viewed from the bottom side thereof.

FIGS. 20, 21(a) and 21(b) are flow charts showing the control operation of the microcomputer 1701. The flow of operation commences from a step 1802 after a step 1801. At the step 1802, a check is made for the state of the main power supply switch 1703. When the main power supply switch 1703 is turned on, the flow comes to a next step 1803. At the step 1803, it becomes possible to accept turning on of the automatic cartridge loading switch 1705 (44) only after the main power supply switch 1703 is found to have been turned on at the step 1802. This process is necessary for preventing the cartridge chamber lid 3 from being inadvertently opened. When the automatic cartridge loading switch 1705 (44) is turned on, the flow of operation proceeds from the step 1803 to a step 1804. At the step 1804, a check is made by means of the above-stated cartridge light-blocking detecting circuit 1716, the flexible printed circuit board 53, the brush switch 54, etc. to find if the film has completely been rewound within the film cartridge 60 and the film cartridge 60 now can be sent out without fear of having a necessary portion of the film exposed to light when the cartridge chamber lid 3 is opened. If the film is found to be still in a photographable state, the flow comes from the step 1804 to a step 1841 to cancel the instruction of the automatic cartridge loading switch 1705.

On the other hand, if the film cartridge 60 is found ready to be sent out or if the camera is not loaded with any film cartridge, the flow comes from the step 1804 to a step 1805. At the step 1805, a check is made by the cartridge chamber lid position detecting circuit 1714 to find whether the cartridge chamber lid 3 is open or closed. If the cartridge chamber lid 3 is found to be open, this indicates that the dividing (or transmitting) destination of the power of the motor 1710 (hereinafter referred to as the first motor 4) has already been changed over to the cartridge chamber lid driving side (the gear meshing state for this is as shown in FIG. 12). If so, the flow comes from the step 1805 to a step 1820. At the step 1820, to prevent the cartridge chamber lid 3 from being left open, the first motor 4 is driven to begin to drive the cartridge chamber lid 3 to close. At a step 1821, a check is made to find if the cartridge chamber lid 3 is completely closed. If so, the flow comes to a step 1822 to bring the cartridge chamber lid closing driving action to an end.

Further, if it is confirmed at the step 1805 that the cartridge chamber lid 3 is in a closed state, the flow comes from the step 1805 to a step 1843. At the step 1843, a check is made for the presence or absence of the film cartridge 60 by using the cartridge loading completion detecting switch 48. If the camera is found to be not loaded with the film cartridge 60, the flow comes from the step 1843 to a step 1812 to cause the first motor 4 to drive the cartridge chamber lid 3 to open it. If the camera is found to be loaded with the film cartridge 60, the flow comes from the step 1843 to a step 1806. At the step 1806, the motor 1712 (hereinafter referred to as the second motor 5) is caused to drive and move the photo-taking lens barrel 2 to the position (2), i.e., the barrel-retracted position (2), where the change-over of the power dividing mechanism becomes possible. At a step 1807, the first motor 4 is caused to begin to drive in the direction of film rewinding (in the direction of opening the cartridge chamber lid 3). Then, as soon as the power dividing mechanism is unlocked, the state of driving is changed from a film transport driving state over to a cartridge chamber lid driving state.

In this instance, to prevent the change-over of the power dividing destination, the time control means 1702 (hereinafter referred to as timer T1) is started at a next step 1808. At a step 1809, the process of power division is left variable for a predetermined period of time $T_A$ (corresponding to the predetermined time $t_0$ mentioned in the foregoing) which is sufficiently long for the change-over of position of the planet gear 26 of the power dividing mechanism. After the lapse of the predetermined period of time $T_A$, the flow comes to a step 1810. At the step 1810, the timer T1 is reset. At a step 1811, the second motor 5 is caused to drive the photo-taking lens barrel 2 to move to the original position (1) (barrel-retracted position). The power dividing destination of the first motor 4 is completely changed to the cartridge chamber lid driving side by this.

Further, since the power dividing destination is arranged to be changed by using the timer T1 as mentioned above, a power dividing action can be smoothly carried out without unnecessarily rotating the sun gear 27, etc., and without imposing any change-over load on the gears.

Upon completion of the change-over of the power dividing destination to the cartridge chamber lid driving side, the film rewinding driving force of the first motor 4 which has been generating a switching force for change-over of the power dividing destination becomes a cartridge chamber lid opening driving force without changing the rotating direction of the first motor 4. In other words, the instant the power dividing destination of the first motor 4 changes from the film transport driving side over to the cartridge chamber lid driving side, the cartridge chamber lid 3 begins to be opened while the rotating direction of the first motor 4 remains unchanged.

While the change-over of the power dividing destination is being executed by the steps 1806 to 1811 in electrical sequence, there is a possibility that the film might happen to be transported even during a short period of the change-over of the power dividing mechanism from the film transporting side to the cartridge-chamber-lid opening-and-closing side. However, since the driving direction of the first motor 4 is in the film rewinding direction, the film cartridge 60 is never moved out. Besides, since it is not necessary to stop the first motor 4 from driving or to change its rotating direction immediately after the change-over of the power dividing destination of the first motor 4, the power dividing destination can be very smoothly changed over to the cartridge chamber lid driving side.

After the commencement of the action of opening the cartridge chamber lid 3, the flow comes to a step 1813. When completion of opening the cartridge chamber lid 3 is detected by the cartridge chamber lid position detecting circuit 1714 at the step 1813, the flow comes to a step 1814. At the step 1814, the action of opening the cartridge chamber lid 3 is brought to an end. At a next step 1815, a check is made by the film cartridge loading completion detecting switch 48 of the cartridge loading position detecting circuit 1715 to find if the film cartridge 60 is within the open cartridge chamber 1b.

If so, the flow comes from the step 1815 to a step 1838 which is shown in FIG. 21(*b*). At the step 1838, the second motor 5 is driven to start an action of sending out the film cartridge 60. At a next step 1839, a check is made, by the film cartridge insertion-and-sending-out detecting switch 47 which is included in the cartridge loading position detecting circuit 1715, to find if the film cartridge 60 has been sent to a predetermined position. If so, the flow comes to a step 1840 to bring the cartridge sending-out driving by the second motor 5 to an end. The flow then comes to a step 1841.

The cartridge chamber 1b remains open after the film cartridge 60 is pulled out by the camera operator. The cartridge chamber 1b is not closed unless again the automatic cartridge loading switch 1705 (44) is turned on.

If it is found, at the step 1815, that there is no film cartridge in the open cartridge chamber 1b, the flow comes from the step 1815 to a step 1816. At the step 1816, the timer T1 disposed within the microcomputer 1701 is started. At steps 1817 and 1818, the flow waits a predetermined period of time $T_B$ for insertion (entering) of the film cartridge. If the film cartridge 60 is not inserted within the predetermined period of time $T_B$, the flow comes from the step 1818 to a step 1819. At the step 1819, the timer T1 is reset. The flow then proceeds to the above-stated steps 1820 to 1822 to drive the first motor 4 to carry out the action of closing the cartridge chamber lid 3.

If it is found that the film cartridge 60 is inserted within the predetermined period of time $T_B$, the flow comes from the step 1817 to a step 1823 shown in FIG. 21(*a*). At the step 1823, the timer T1 is reset. At a next step 1824, the second motor 5 the driving direction of which has been changed from the photo-taking lens barrel driving side over to the film cartridge moving side is driven to start an action of pulling in the film cartridge 60. At a step 1825, a check is made for the state of the film cartridge loading completion detecting switch 48 of the film cartridge loading position detecting circuit 1715. If the film cartridge 60 is pulled into the cartridge chamber 1b by the driving roller 7 to cause the film cartridge loading completion detecting switch 48 to turn on, the flow comes to a step 1826. At the step 1826, the second motor 5 is stopped from driving.

At a next step 1827, the first motor 4 is caused to begin to drive the cartridge chamber lid 3 to close. At a step 1828, a check is made to find if the cartridge chamber lid 3 has pushed and turned on the cartridge chamber lid closing completion detecting switch 46. If so, that is, upon confirmation of that the cartridge chamber lid 3 has been completely closed, the flow comes to a step 1829 to temporarily bring to an end the action of driving the cartridge chamber lid 3 to close. With the cartridge chamber lid 3 closed in this manner, the use of the power of the second motor 5 is changed from the film cartridge moving side over to the photo-taking lens barrel moving side. At a step 1830, the second motor 5 is caused to drive the photo-taking lens barrel 2 to move to the barrel-retracted position (2). Further, with the photo-taking lens barrel 2 thus moved to the barrel-retracted position (2), the use of the power of the first motor 4 changes from the cartridge chamber lid driving side over to the film transport driving side. At a next step 1831, therefore, the first motor 4 is caused to be again driven in the direction of winding the film.

Next, at a step 1832, the timer T1 is started to ensure the change-over of the power dividing destination in the same manner as the steps 1808 to 1810. At a step 1833, the flow waits for the lapse of the predetermined time $T_A$. At a step 1834, the timer T1 is reset after the lapse of the predetermined time $T_A$. At a step 1835, the second motor 5 is driven to move the photo-taking lens barrel 2 from the barrel-retracted position (2) back to the barrel-retracted position (1). The power dividing mechanism is then held in a state of transmitting the output of the first motor 4 to the film transport driving side. By this, the power of the first motor 4 begins to be used for winding the film the instant the transmission of power is changed from the cartridge chamber lid driving side over to the film transport driving side. The film payed out from the film cartridge 60 is taken up on the film take-up spool while the position of the film is being detected by film position detecting means disposed within the camera. At a step 1836, a check is made by the film position detecting means to find if the film has been sent out to a photographable position. If so, the process of blank film feeding is considered to be finished and the flow comes from the step 1836 to a step 1837 to bring the film winding driving by the first motor 4 to an end.

Further, in the series of actions, by the steps 1829 to 1837, from the closing driving action on the cartridge chamber lid 3 through the automatic feeding of the film to a photographable position, the first motor 4 is rotated in one and the same direction both for closing the cartridge chamber lid 3 and for winding the film. The steps 1829 and 1831, therefore, may be omitted. The first motor 4 thus does not have to be stopped nor caused to make a reverse rotation until completion of film winding up to the photographable position after the commencement of the cartridge chamber lid closing driving action. The power, therefore, can be vary smoothly changed over to film transport driving. Further, although there is the possibility that the cartridge chamber lid 3 might happen to be driven within a short period of time during which the power dividing mechanism changes its state from the cartridge chamber lid driving state over to the film transport driving state, after completion of closing of the cartridge chamber lid 3. However, by virtue of the coincidence of the direction of film winding driving and that of cartridge chamber lid driving with each other, the cartridge chamber lid 3 is never driven to open.

The camera thus can be automatically loaded with the film cartridge 60 in the manner described above.

After that, when the main power supply switch 44 is found to be turned off at a step 1841, the series of actions comes to an end. After that, no operation on the automatic cartridge loading switch 44 is accepted.

The use of the film transport mechanism, the cartridge chamber lid opening-and-closing mechanism, the photo taking lens driving mechanism, the cartridge inserting-and-sending-out mechanism, the sequence of mechanical arrangement, the sequence of electrical arrangement and the electric circuit in combination gives an automatic cartridge loading mechanism having the following advantages The stopper 32 and the friction spring 33 are employed as parts of power dividing means for dividing into a plurality of powers the power of the first motor 4 which is interlocked with the action of driving the photo-taking lens barrel 2 with the power of the second motor 5. The provision of the stopper 32 and the friction spring 33 obviates the necessity of providing an expensive plunger, etc., for change-over of the power dividing destination. The use of them thus permits reduction in size and cost.

The planetary gear mechanism consisting of the sun gear 37, the planet gear 38 and the planetary plate 42 is arranged to be changed from one state over to the other by the movement of the cartridge chamber lid 3. In other words, power dividing means is composed of the planetary gear mechanism and the cartridge chamber lid 3. This arrangement also obviates the necessity of use of expensive parts such a plunger, etc., and thus also permits reduction in size and cost of the camera.

The embodiment is provided with the switches 45 and 46 for detecting the positions of the cartridge chamber lid 3, the switches 47 and 48 for detecting the state of loading the film cartridge 60 and the automatic cartridge loading switch 4 for automatically loading the camera with the film cartridge 60. The microcomputer 8 is arranged to control the driving actions of the first and second motors 4 and 5 according to the states of these switches. Therefore, the arrangement not only permits reduction in size and cost but also permits the cartridge chamber lid 3 to be opened and closed and the film cartridge 60 to be pulled in and sent out accurately and without difficulty.

The photo-taking lens 2 is arranged to take nonphotographing positions, i.e., the two barrel-retracted positions (1) and (2) in the case of the embodiment described. The embodiment is arranged to permit change-over or switching of the power dividing destination by shifting the cam tube 2' to one of these two positions. The arrangement thus obviates the necessity of providing any additional position for the change-over.

A timer is used for the change-over of the power dividing destination of the power of the first motor 4 by the power dividing mechanism which is composed of the sun gear 25, the planet gear 26, the positioning stopper 32, etc. (for shifting the photo-taking lens barrel 2 to the barrel-retracted position (2)). The use of the timer enables the embodiment to smoothly carry out the power dividing action without causing the sun gear 27, etc., to make any unnecessary rotation and without imposing any load of change-over on these gears.

Further, at least a part of the cartridge chamber lid driving gear 36 which directly drives the cartridge chamber lid 3 is disposed within a space (a space A shown in FIG. 6) which is a dead space according to the conventional arrangement and is located in the neighborhood of a film feeding opening provided in the cartridge chamber 1b formed in the camera in a shape analogized to the shape of the film cartridge. (In the case of the embodiment, the whole gear 36 is disposed within the space A.) Therefore, the cartridge chamber lid 3 can be arranged to be automatically opened and closed without increasing the size of the camera.

The first motor 4 is arranged to perform the cartridge chamber lid closing driving action and the film winding driving action by rotating in one and the same direction and also to perform the film rewinding driving and the cartridge chamber lid opening driving action by rotating in one and the same direction. This arrangement obviates the necessity of changing the rotating direction of the first motor 4 at the time of the change-over of power dividing destination, so that the power dividing action can be very smoothly accomplished.

The embodiment described is arranged to perform the change-over of power dividing destination by setting the photo-taking lens barrel 2 in the barrel-retracted position. This arrangement, however, may be changed to perform it when the photo-taking lens barrel 2 is in some other position, such as a non-photographing position obtained while the photo-taking lens barrel 2 is in process of being retracted.

The change-over of power dividing destination may be arranged to be controlled by moving some optical system instead of the photo-taking lens barrel 2.

Further, the power dividing destinations are of course not limited to what has been described but may be changed to various other combinations as necessary. For example, the invention is applicable to a case where the power dividing destinations include driving the light blocking cover of a cartridge to open and close it.

Further, the cameras to which this invention is applicable is not limited to the camera of the kind inserting a film cartridge from below the camera body as in the case of the embodiment described. This invention applies also to a camera arranged to have a film cartridge inserted, for example, from above or from one side.

Further, this invention is not limited to a camera arranged to have a film cartridge axially inserted as in the case of the embodiment described. This invention is also applicable to an apparatus of the kind using an image recording medium other than a film.

This invention applies also to cartridges of any type other than the type of the cartridge used by the embodiment described, a cartridge containing an image recording medium other than a film, a cartridge of a different kind, and a loading matter which is not a cartridge and is, for example, a battery or the like.

Further, the individual components shown in schematic or block form in the drawings are all well-known in the camera arts and their specific construction and operation are not critical to the operation or best mode for carrying out the invention.

While this invention has been described with respect to what is presently considered to be preferred embodiments, it is to be understood that the invention is not limited to the disclosed embodiments. To the contrary, the invention is intended to cover various modifications and equivalent arrangements included within the spirit and scope of the appended claims. The scope of the following claims is to be accorded the broadest interpretation so as to encompass all such modifications and equivalent structures and functions.

Further, this invention is applicable to a case where the whole or part of the appended claims or the arrangement of the embodiment described form an apparatus or a device arranged toe be coupled with some other device or to form a component of an apparatus.

This invention is applicable also to cameras of varied kinds including a single-lens reflex camera, a lens-shutter type camera, a video camera, to an optical apparatus or some other apparatus other than a camera or to component elements of such apparatuses.

What is claimed is:

1. An apparatus, comprising:
   a) a switching device for switching a power transmission system at least between a first state and a second state; and
   b) a holding device for holding said switching device at least in the first state and the second state, said holding device performing said holding while being interlocked with a member which moves in connection with an operation of an optical unit.

2. An apparatus according to claim 1, further comprising a moving device for moving an image recording medium by receiving power transmitted from said power transmission system with said power transmission system switched to the first state by said switching device.

3. An apparatus according to claim 2, wherein said image recording medium includes a film.

4. An apparatus according to claim 2, further comprising a performing device for performing an action related to at least one of loading and unloading actions to be performed on an image recording medium cartridge by receiving power transmitted from said power transmission system with said power transmission system switched to the second state by said switching device.

5. An apparatus according to claim 2, further comprising a performing device for performing at least one of opening and closing actions to be performed on an image recording medium cartridge loading chamber by receiving power transmitted from said power transmission system with said power transmission system switched to the second state by said switching device.

6. An apparatus according to claim 1, further comprising a performing device for performing an action related to at least one of loading and unloading actions to be performed on an image recording medium cartridge by receiving power transmitted from said power transmission system with said power transmission system switched to the second state by said switching device.

7. An apparatus according to claim 1, further comprising a performing device for performing at least one of opening and closing actions on an image recording medium cartridge loading chamber by receiving power transmitted from said power transmission system with said power transmission system switched to the second state by said switching device.

8. An apparatus for use with a cartridge for an image recording medium and adapted to a device comprising a cartridge chamber for housing the image recording medium cartridge, a performing device for performing an action related to at least one of charging (loading) the image recording medium cartridge in the cartridge chamber and discharging (unloading) the cartridge from the chamber, and a moving device for moving the image recording medium relative to the cartridge, said apparatus comprising:
   a) a transmitting device for transmitting a driving force to said performing device and said moving device; and
   b) a switching device for switching the destination of driving force transmission by said transmitting device.

9. An apparatus according to claim 8, further comprising a motor for supplying a driving force to said transmitting device.

10. An apparatus according to claim 8, wherein said performing device performs at least one of opening and closing a chamber for loading the image recording medium cartridge.

11. An apparatus according to claim 8, wherein said image recording medium includes a film and said cartridge includes a film cartridge.

12. An apparatus for use with a cartridge for an image recording medium and adapted to a device comprising a cartridge chamber for housing the image recording medium cartridge, a performing device for performing an action related to at least one of charging (loading) the image recording medium cartridge in the cartridge chamber and discharging (unloading) the cartridge from the chamber and a moving device for moving the image recording medium relative to the cartridge, said apparatus comprising:

a) a transmitting device for transmitting a driving force to said performing device and said moving device; and b) a motor for supplying the driving force to said transmitting device.

13. An apparatus according to claim 12, wherein said performing device performs at least one of opening and closing a chamber for loading the image recording medium cartridge.

14. An apparatus according to claim 12, wherein said image recording medium includes a film and said cartridge includes a film cartridge.

15. An apparatus for use with a cartridge for an image recording medium and adapted to a device comprising a cartridge chamber for housing the image recording medium cartridge, a performing device for performing an action related to at least one of charging (loading) the image recording medium cartridge in the cartridge chamber and discharging (unloading) the cartridge from the chamber, and a moving device for moving the image recording medium relative to the cartridge, said apparatus comprising:

a) a transmitting device for transmitting a driving force to said performing device and said moving device; and b) a supplying device for supplying the driving force to said transmitting device, said supplying device using as a drive source an electric energy.

16. An apparatus according to claim 15, wherein said performing device performs at least one of opening and closing a chamber for loading the image recording medium cartridge.

17. An apparatus according to claim 15, wherein said image recording medium includes a film and said cartridge includes a film cartridge.

18. An apparatus for use with a cartridge for an image recording medium adapted to a device comprising a cartridge chamber for housing the image recording medium cartridge, a performing device for performing an action related to at least one of charging (loading) the image recording medium cartridge in the cartridge chamber and discharging (unloading) the cartridge from the chamber, and a driving device for driving an optical system, said apparatus comprising:

a) a transmitting device for transmitting a driving force to said performing device and said driving device; and b) a motor for supplying the driving force to said transmitting device.

19. A camera according to claim 18, wherein said performing device moves the image recording medium cartridge for at least one of loading and unloading actions on the image recording medium cartridge.

20. An apparatus according to claim 18, wherein said cartridge includes a film cartridge.

21. An apparatus for use with a cartridge for an image recording medium and adapted to a device comprising a cartridge chamber for housing the image recording medium cartridge, a performing device for performing an action related to at least one of charging (loading) the image recording medium cartridge in the cartridge chamber and discharging (unloading) the cartridge from the chamber, and a driving device for driving an optical system, said apparatus comprising:

a) a transmitting device for transmitting a driving force to said performing device and said driving device; and b) a supplying device for supplying the driving force to said transmitting device, said supplying device using as a drive source an electric energy.

22. A camera according to claim 21, wherein said performing device moves the image recording medium cartridge for at least one of loading and unloading actions on the image recording medium cartridge.

23. An apparatus according to claim 21, wherein said cartridge includes a film cartridge.

24. An apparatus according to claim 1, wherein said apparatus comprises a camera.

25. An apparatus according to claim 8, wherein said apparatus comprises a camera.

26. An apparatus according to claim 12, wherein said apparatus comprises a camera.

27. An apparatus according to claim 15, wherein said apparatus comprises a camera.

28. An apparatus according to claim 18, wherein said apparatus comprises a camera.

29. An apparatus according to claim 21, wherein said apparatus comprises a camera.

\* \* \* \* \*

UNITED STATES PATENT AND TRADEMARK OFFICE
CERTIFICATE OF CORRECTION

PATENT NO.    : 6,085,043
DATED         : July 4, 2000
INVENTOR(S)   : Ryoji Okuno It is certified that error appears in the above-identified patent and that said Letters Patent is hereby corrected as shown below:

Column 5,
Line 2, before "stopper" insert -- A --.

Signed and Sealed this

Ninth Day of September, 2003

JAMES E. ROGAN
*Director of the United States Patent and Trademark Office*